(12) United States Patent
Hauville et al.

(10) Patent No.: US 11,119,460 B2
(45) Date of Patent: *Sep. 14, 2021

(54) METHOD AND APPARATUS FOR ENSURING AIR QUALITY IN A BUILDING, INCLUDING METHOD AND APPARATUS FOR CONTROLLING A WORKING DEVICE USING A HANDHELD UNIT HAVING SCANNING, NETWORKING, DISPLAY AND INPUT CAPABILITY

(71) Applicant: FIPAK Research And Development Company, Rowley, MA (US)

(72) Inventors: Stephan Hauville, Byfield, MA (US); Antoine Hauville, La Londe (FR)

(73) Assignee: FIPAK Research And Development Company, Rowley, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/736,104

(22) Filed: Jan. 7, 2020

(65) Prior Publication Data
US 2020/0387124 A1    Dec. 10, 2020

Related U.S. Application Data

(63) Continuation of application No. 15/640,725, filed on Jul. 3, 2017, now Pat. No. 10,528,014, which is a
(Continued)

(51) Int. Cl.
*F24F 11/39* (2018.01)
*F24F 11/52* (2018.01)
(Continued)

(52) U.S. Cl.
CPC .............. *G05B 15/02* (2013.01); *B08B 15/00* (2013.01); *F24F 3/16* (2013.01); *F24F 7/06* (2013.01);
(Continued)

(58) Field of Classification Search
CPC ...... B01D 46/00; B01D 46/18; B01D 46/008; B01D 46/42; B01D 46/521; G06Q 10/20;
(Continued)

(56) References Cited

U.S. PATENT DOCUMENTS 2,243,916 A    6/1941  Mueller
D159,487 S    8/1950  Jaye
(Continued)

FOREIGN PATENT DOCUMENTS

CN    103105195    5/2013
CN    202902475    4/2014
(Continued)

*Primary Examiner* — Minh Chau T Pham
(74) *Attorney, Agent, or Firm* — Pandiscio & Pandiscio

(57) ABSTRACT

A method for wirelessly controlling a working device using a handheld unit, the method including connecting the working device to a central server by a network, wherein the working device is uniquely identified on the network by an assigned network address, wherein a device-specific identification marker is linked to the assigned network address of the working device; scanning the identification marker with the handheld unit, whereby to identify the working device and the assigned network address linked to the working device; and using the handheld unit to cause the central server to communicate with and control the working device at the assigned network address, whereby to allow the user to control operation of the working device via the handheld device and/or to receive data concerning the working device from the central server.

24 Claims, 22 Drawing Sheets

Related U.S. Application Data continuation of application No. 14/635,206, filed on Mar. 2, 2015, now Pat. No. 9,696,703, which is a continuation-in-part of application No. 14/281,416, filed on May 19, 2014, now Pat. No. 8,986,427.

(60) Provisional application No. 61/824,997, filed on May 18, 2013, provisional application No. 61/946,292, filed on Feb. 28, 2014.

(51) Int. Cl.
| | | |
|---|---|---|
| *B01D 46/00* | (2006.01) | |
| *B01D 46/18* | (2006.01) | |
| *G05B 15/02* | (2006.01) | |
| *B08B 15/00* | (2006.01) | |
| *F24F 3/16* | (2021.01) | |
| *F24F 7/06* | (2006.01) | |
| *F24F 11/77* | (2018.01) | |
| *H04W 4/70* | (2018.01) | |
| *F24F 11/32* | (2018.01) | |

(52) U.S. Cl.
CPC .............. *F24F 11/77* (2018.01); *H04W 4/70* (2018.02); *F24F 11/32* (2018.01); *F24F 11/39* (2018.01); *F24F 11/52* (2018.01); *F24F 2221/14* (2013.01); *Y02B 30/70* (2013.01); *Y10S 55/34* (2013.01)

(58) Field of Classification Search
CPC . H04W 4/70; B08B 15/00; F24F 11/77; F24F 3/16; F24F 7/06; F24F 11/32; F24F 11/52; F24F 11/39; F24F 2221/14; Y10S 55/34
USPC ............. 95/277; 55/351, 352, 354, DIG. 34; 96/25, 417, 429; 174/358; 439/86, 271
See application file for complete search history.

(56) References Cited

U.S. PATENT DOCUMENTS

| | | | |
|---|---|---|---|
| 3,357,763 A | 12/1967 | Toper | |
| D211,790 S | 7/1968 | Murray | |
| D285,830 S | 9/1986 | Daily et al. | |
| D288,519 S | 3/1987 | Taylor | |
| 4,713,099 A | 12/1987 | Schroeder | |
| D325,254 S | 4/1992 | Ruuskanen | |
| 5,443,625 A | 8/1995 | Schaffhausen | |
| D373,348 S | 9/1996 | Carlson | |
| 5,711,785 A | 1/1998 | Maxwell | |
| D396,097 S | 7/1998 | Thomas et al. | |
| D402,361 S | 12/1998 | Nepsund et al. | |
| 6,267,793 B1 | 7/2001 | Gomez et al. | |
| 6,284,011 B1 | 9/2001 | Chiang et al. | |
| 6,321,034 B2 | 11/2001 | Jones-Lawlor et al. | |
| D453,822 S | 2/2002 | Meeks et al. | |
| 6,428,592 B1 | 8/2002 | Chase et al. | |
| 6,494,199 B1 | 12/2002 | Zia et al. | |
| 6,554,880 B1 | 4/2003 | Northcutt | |
| D483,844 S | 12/2003 | Yamamoto et al. | |
| D486,485 S | 2/2004 | Dodson | |
| 6,797,028 B2 | 9/2004 | Duffy | |
| D502,254 S | 2/2005 | Smith et al. | |
| D534,262 S | 12/2006 | Rho | |
| 7,244,294 B2 | 7/2007 | Kates | |
| 7,272,525 B2 | 9/2007 | Bennett et al. | |
| D558,317 S | 12/2007 | Francisquini | |
| 7,462,220 B2 | 12/2008 | Farmer | |
| 7,749,303 B2 | 7/2010 | Wright | |
| 7,811,365 B2 | 10/2010 | Grzonka et al. | |
| 7,875,099 B2 * | 1/2011 | Abraham | G06F 1/206 95/4 |
| D636,857 S | 4/2011 | Jacques et al. | |
| D638,529 S | 5/2011 | Gedcke et al. | |
| D645,130 S | 9/2011 | Goldstein et al. | |
| 8,057,565 B2 | 11/2011 | Yabu et al. | |
| 8,070,139 B2 | 12/2011 | Nassirpour et al. | |
| D653,320 S | 1/2012 | Watanabe et al. | |
| 8,101,000 B2 | 1/2012 | Uhlik et al. | |
| 8,150,387 B2 | 4/2012 | Klein et al. | |
| D661,696 S | 6/2012 | Takada | |
| 8,282,002 B2 | 10/2012 | Shams | |
| D680,636 S | 4/2013 | Ching | |
| D689,995 S | 9/2013 | Dios | |
| 8,657,936 B2 * | 2/2014 | Sullivan | B01D 46/42 95/277 |
| 8,686,871 B2 | 4/2014 | Jensen et al. | |
| 8,861,924 B2 | 10/2014 | Meads et al. | |
| 8,870,057 B2 | 10/2014 | Campbell et al. | |
| 8,936,194 B1 | 1/2015 | Welch et al. | |
| 8,986,427 B2 * | 3/2015 | Hauville | B01D 46/4254 95/8 |
| 9,320,996 B1 | 4/2016 | Baldwin, Jr. | |
| 9,696,703 B2 * | 7/2017 | Hauville | F24F 7/06 |
| 10,528,014 B2 * | 1/2020 | Hauville | F24F 7/06 |
| 2001/0049927 A1 | 12/2001 | Toepel | |
| 2005/0278047 A1 | 12/2005 | Ahmed | |
| 2006/0174596 A1 | 8/2006 | Choi et al. | |
| 2007/0032225 A1 | 2/2007 | Konicek et al. | |
| 2007/0144119 A1 | 6/2007 | Bauer | |
| 2007/0275651 A1 | 11/2007 | Palmer | |
| 2009/0044703 A1 | 2/2009 | Bias et al. | |
| 2009/0075582 A1 | 3/2009 | Wilkerson | |
| 2009/0229469 A1 | 9/2009 | Campbell et al. | |
| 2009/0311951 A1 | 12/2009 | Walkinshaw | |
| 2010/0174599 A1 | 7/2010 | Rosenblatt et al. | |
| 2010/0294134 A1 | 11/2010 | Yokomizo et al. | |
| 2010/0324741 A1 | 12/2010 | House et al. | |
| 2011/0232481 A1 | 9/2011 | Worrilow | |
| 2012/0064923 A1 | 3/2012 | Imes et al. | |
| 2012/0087087 A1 | 4/2012 | Nicolai et al. | |
| 2013/0073431 A1 | 3/2013 | Suro et al. | |
| 2013/0268127 A1 | 10/2013 | Casilli et al. | |
| 2013/0275313 A1 | 10/2013 | Vahid | |
| 2014/0018940 A1 | 1/2014 | Casilli | |
| 2014/0085309 A1 | 3/2014 | Czapar | |
| 2014/0303755 A1 | 10/2014 | Landgrat et al. | |
| 2015/0290572 A1 | 10/2015 | Stoner, Jr. et al. | |

FOREIGN PATENT DOCUMENTS

| | | |
|---|---|---|
| EP | 2101118 | 9/2009 |
| EP | 2199695 | 6/2010 |
| EP | 2246637 | 11/2010 |
| JP | 50-50250 | 5/1975 |
| JP | S57153139 | 9/1982 |
| JP | 58-117935 | 7/1983 |
| JP | 5-15728 | 1/1993 |
| JP | 9-38449 | 2/1997 |
| JP | 2000-18698 | 1/2000 |
| JP | 2000-81231 | 3/2000 |
| JP | 2001-12777 | 1/2001 |
| JP | 2004-20035 | 1/2004 |
| JP | 2008-73642 | 4/2008 |
| JP | 2009-45225 | 3/2009 |
| JP | 2009-119373 | 6/2009 |
| JP | 2011-052851 | 3/2011 |
| KR | 2008 0103814 | 11/2008 |
| KR | 2010 0078196 | 7/2010 |
| WO | WO2006/135758 | 12/2006 |
| WO | WO2011/024424 | 3/2011 |
| WO | WO2011/119691 | 9/2011 |
| WO | WO 2012/167280 | 12/2012 |

* cited by examiner

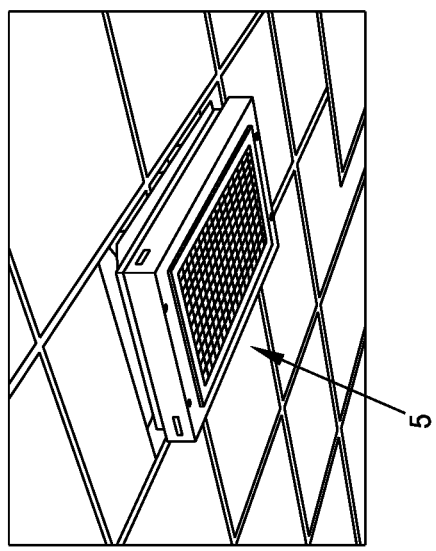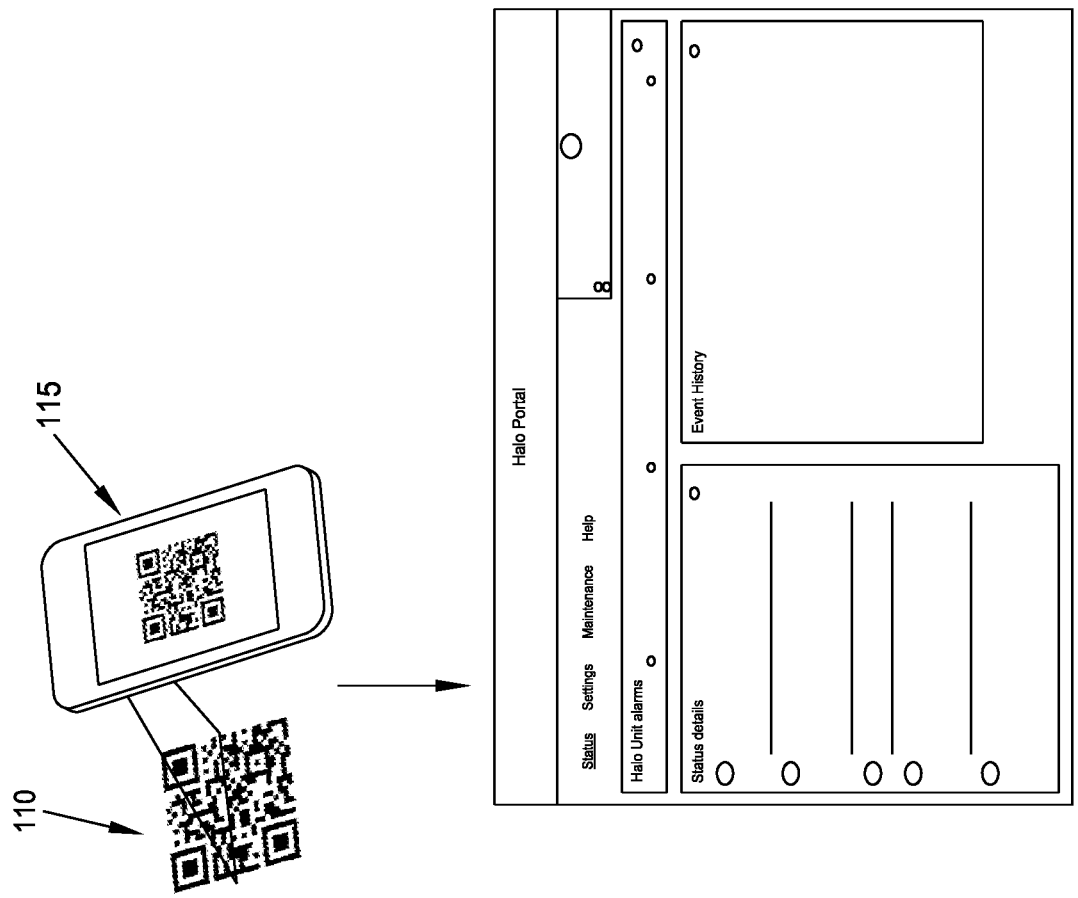
FIG. 22

METHOD AND APPARATUS FOR ENSURING AIR QUALITY IN A BUILDING, INCLUDING METHOD AND APPARATUS FOR CONTROLLING A WORKING DEVICE USING A HANDHELD UNIT HAVING SCANNING, NETWORKING, DISPLAY AND INPUT CAPABILITY

REFERENCE TO PENDING PRIOR PATENT APPLICATIONS

This patent application is a continuation of prior U.S. patent application Ser. No. 15/640,725, filed Jul. 3, 2017 by FIPAK Research And Development Company for METHOD AND APPARATUS FOR ENSURING AIR QUALITY IN A BUILDING, INCLUDING METHOD AND APPARATUS FOR CONTROLLING A WORKING DEVICE USING A HANDHELD UNIT HAVING SCANNING, NETWORKING, DISPLAY AND INPUT CAPABILITY, which patent application is a continuation of prior U.S. patent application Ser. No. 14/635,206, filed Mar. 2, 2015 by FIPAK Research And Development Company for METHOD AND APPARATUS FOR ENSURING AIR QUALITY IN A BUILDING, INCLUDING METHOD AND APPARATUS FOR CONTROLLING A WORKING DEVICE USING A HANDHELD UNIT HAVING SCANNING, NETWORKING, DISPLAY AND INPUT CAPABILITY, which patent application (i) is a continuation-in-part of prior U.S. patent application Ser. No. 14/281,416, filed May 19, 2014 by FIPAK Research And Development Company and Stephan Hauville et al. for METHOD AND APPARATUS FOR MONITORING AND ENSURING AIR QUALITY IN A BUILDING, which patent application claims benefit of prior U.S. Provisional Patent Application Ser. No. 61/824,997, filed May 18, 2013 by FIPAK Research And Development Company and Stephan Hauville et al. for METHOD AND APPARATUS FOR HANDLING AIR IN A LABORATORY BUILDING; and (ii) claims benefit of prior U.S. Provisional Patent Application Ser. No. 61/946,292, filed Feb. 28, 2014 by FIPAK Research And Development Company and Stephan Hauville et al. for METHOD AND APPARATUS FOR HANDLING AIR IN A LABORATORY BUILDING.

The five (5) above-identified patent applications are hereby incorporated herein by reference.

FIELD OF THE INVENTION

This invention relates to methods and apparatus for ensuring air quality in a building. Among other things, this invention relates to methods and apparatus for handling air in a laboratory space (or other building space) where the presence of noxious substances (e.g., hazardous chemicals) would normally require an increased rate of air exchanges for that laboratory space (or other building space) in order to ensure the comfort and/or safety of the occupants. This invention also relates to methods and apparatus for controlling a working device using a handheld unit having scanning, networking, display and input capability.

BACKGROUND OF THE INVENTION

Modern building codes require that the air in a room of a building be circulated a minimum number of times in a given period of time in order to ensure the comfort and/or safety of the occupants, e.g., it is common for modern building codes to require a minimum of 2-4 air exchanges per hour for each room of the building.

However, in some areas of some buildings (e.g., laboratory spaces, hospital spaces, anatomy labs, animal care facilities, utility rooms containing heating systems and the like, garages, locker rooms, etc.), the presence of noxious substances (e.g., hazardous chemicals) may require a higher rate of air exchanges in order to ensure the comfort and/or safety of the occupants.

By way of example but not limitation, in a laboratory space where chemicals are handled on the open bench, without the protection of a fumehood, a higher rate of air exchanges (e.g., 8-12 air exchanges per hour) may be mandated in order to ensure the comfort and/or safety of the occupants. This higher rate of air exchanges is in addition to, and is not a substitute for, any fumehoods which may be provided in the laboratory space.

It will be appreciated that the higher rate of air exchanges for these laboratory spaces, while extremely important for the comfort and/or safety of the occupants, are nonetheless expensive due to the energy loss associated with the air exchange process. More particularly, the air exchanges are typically effected using the ambient air outside the building, and this outside ambient air must generally be conditioned (e.g., heated or cooled) before it is introduced into the laboratory space as replacement air for the laboratory space. This heating or cooling consumes energy, and energy is expensive. This is particularly true in colder and warmer climates, since more heating or cooling must be effected for the ambient outside air prior to introducing that air into the laboratory space as replacement air.

In view of this, it will be appreciated that energy costs are significantly higher for laboratory spaces (and/or other building spaces) which require an increased rate of air exchanges (e.g., 8-12 air exchanges per hour) than for those rooms which do not require an increased rate of air exchanges (e.g., only 2-4 air exchanges per hour).

Thus there is a need for a new approach for handling air in a laboratory space (and/or other building spaces) which would normally require an increased rate of air exchanges (e.g., 8-12 air exchanges per hour), in order to reduce the energy losses associated with the increased rate of air exchanges.

In addition, working devices for ensuring air quality in a building typically require an on-board display screen for allowing a user to operate the working device. However, such on-board display screens generally increase the cost of the working device. Thus, there is also a need for a new approach for controlling a working device without requiring that the working device have an on-board display screen in order to reduce the cost of the working device.

In addition, many other types of working devices typically require an on-board display screen for allowing a user to operate the working device. However, such on-board display screens generally increase the cost of these working device. Thus, there is also a need for a new approach for controlling other types of working devices without requiring that the working device have an on-board display screen in order to reduce the cost of the working device.

SUMMARY OF THE INVENTION

The present invention provides a new approach for handling air in a laboratory space (and/or other building spaces) which would normally require an increased rate of air exchanges (e.g., 8-12 air exchanges per hour), in order to reduce the energy losses associated with the increased rate of air exchanges. This is achieved by the provision and use of a novel air treatment device which transforms the air exchange load of a higher air exchange rate space into the air exchange load of a lower air exchange rate space.

In addition, the present invention provides a new approach for controlling a working device of the sort normally requiring an on-board display screen for allowing a user to operate the working device. More particularly, the present invention provides a novel method and apparatus for controlling the working device without requiring that the working device have an on-board display screen. This is achieved by the provision and use of a novel system which enables the working device to be controlled using a handheld unit having scanning, networking, display and input capability.

Furthermore, the present invention provides a new approach for controlling other types of working devices of the sort normally requiring an on-board display screen for allowing a user to operate the working device. More particularly, the present invention provides a novel method and apparatus for controlling the working device without requiring that the working device have an on-board display screen. This is achieved by the provision and use of a novel system which enables the working device to be controlled using a handheld unit having scanning, networking, display and input capability.

In one preferred form of the invention, there is provided apparatus for transforming the air exchange load of a higher air exchange rate space into the air exchange load of a lower air exchange rate space, said apparatus comprising:

a housing for mounting to a surface of the higher air exchange rate space;

an air inlet formed in said housing;

at least one air outlet formed in said housing;

a passageway extending through said housing and connecting said air inlet to said at least one air outlet;

a circulation fan disposed in said passageway so as to draw the air of the higher air exchange rate space into said air inlet, through said passageway, and return that air to the higher air exchange rate space through said at least one air outlet; and a filter disposed in said passageway for purging noxious substances from the air passing through said passageway, whereby to transform the air exchange load of a higher air exchange rate space into the air exchange load of a lower air exchange rate space.

In another preferred form of the invention, there is provided a method for handling the air exchange load of a higher air exchange rate space in a building having an air exchange system, said method comprising:

providing apparatus for transforming the air exchange load of a higher air exchange rate space into the air exchange load of a lower air exchange rate space, said apparatus comprising:

a housing for mounting to a surface of the higher air exchange rate space;

an air inlet formed in said housing;

at least one air outlet formed in said housing;

a passageway extending through said housing and connecting said air inlet to said at least one air outlet;

a circulation fan disposed in said passageway so as to draw the air of the higher air exchange rate space into said air inlet, through said passageway, and return that air to the higher air exchange rate space through said at least one air outlet; and a filter disposed in said passageway for purging noxious substances from the air passing through said passageway;

positioning said apparatus in the higher air exchange rate space, and operating said apparatus so as to transform the air exchange load of a higher air exchange rate space into the air exchange load of a lower air exchange rate space; and operating the air exchange system of the building so as to provide a lower air exchange rate to the higher air exchange rate space.

In another preferred form of the invention, there is provided a method for wirelessly controlling a working device using a handheld unit, said method comprising:

connecting said working device to a central server by a network, wherein said working device is uniquely identified on said network by an assigned network address, and further wherein said working device and said central server are configured so that said central server can receive data concerning operation of said working device, and control operation of said working device, via said network;

positioning a device-specific identification marker at said working device, wherein said device-specific identification marker is linked to said assigned network address of said working device;

scanning said device-specific identification marker with said handheld unit, whereby to identify said working device and said assigned network address linked to said working device; and using said handheld unit to cause said central server to communicate with and control said working device at said assigned network address, whereby to allow the user to control operation of said working device via said handheld device and/or to receive data concerning said working device from said central server.

In another preferred form of the invention, there is provided a system comprising:

a working device connected to a central server by a network, wherein said working device is uniquely identified on said network by an assigned network address, and further wherein said working device and said central server are configured so that said central server can receive data concerning operation of said working device, and control operation of said working device, via said network;

a device-specific identification marker disposed at said working device, wherein said device-specific identification marker is linked to said assigned network address of said working device; and a handheld unit having scanning, networking, display and input capability, such that said handheld unit can scan said device-specific identification marker, connect to said central server via said network, identify said working device and said assigned network address linked to said working device, and cause said central server to communicate with and control said working device at said assigned network address, whereby to allow the user to control operation of said working device via said handheld device and/or to receive data concerning said working device from said central server.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein:

FIG. 22 is a schematic view showing the device-specific QR code being used in order to allow a handheld unit having scanning, networking, display and input capability to communicate with and control the working device.

DETAILED DESCRIPTION OF THE PREFERRED EMBODIMENTS

Method and Apparatus for Transforming the Air Exchange Load of a Higher Air Exchange Space into the Air Exchange Load of a Lower Air Exchange Space The present invention provides a new approach for handling air in a laboratory space (and/or other building spaces) which would normally require an increased rate of air exchanges (e.g., 8-12 air exchanges per hour), in order to reduce the energy losses associated with the increased rate of air exchanges.

More particularly, the present invention provides a novel air treatment device which purges noxious substances (e.g., hazardous chemicals) from the air of a laboratory space (and/or other building spaces such as hospital spaces, anatomy labs, animal care facilities, utility rooms containing heating systems and the like, garages, locker rooms, etc.). The novel air treatment device is installed in a laboratory space (and/or other building spaces) which would normally require an increased rate of air exchanges (e.g., 8-12 air exchanges per hour) in order to allow the laboratory space (and/or other building spaces) to be operated at a reduced rate of air exchanges (e.g., 2-4 air exchanges per hour) while still ensuring the comfort and safety of the occupants. Thus, by using the novel air treatment device of the present invention in a laboratory space (and/or other building spaces) which would normally require an increased rate of air exchanges, the rate of air exchanges for the laboratory space (and/or other building spaces) may be reduced, whereby to reduce the energy losses associated with the air exchange process.

Figure 1:
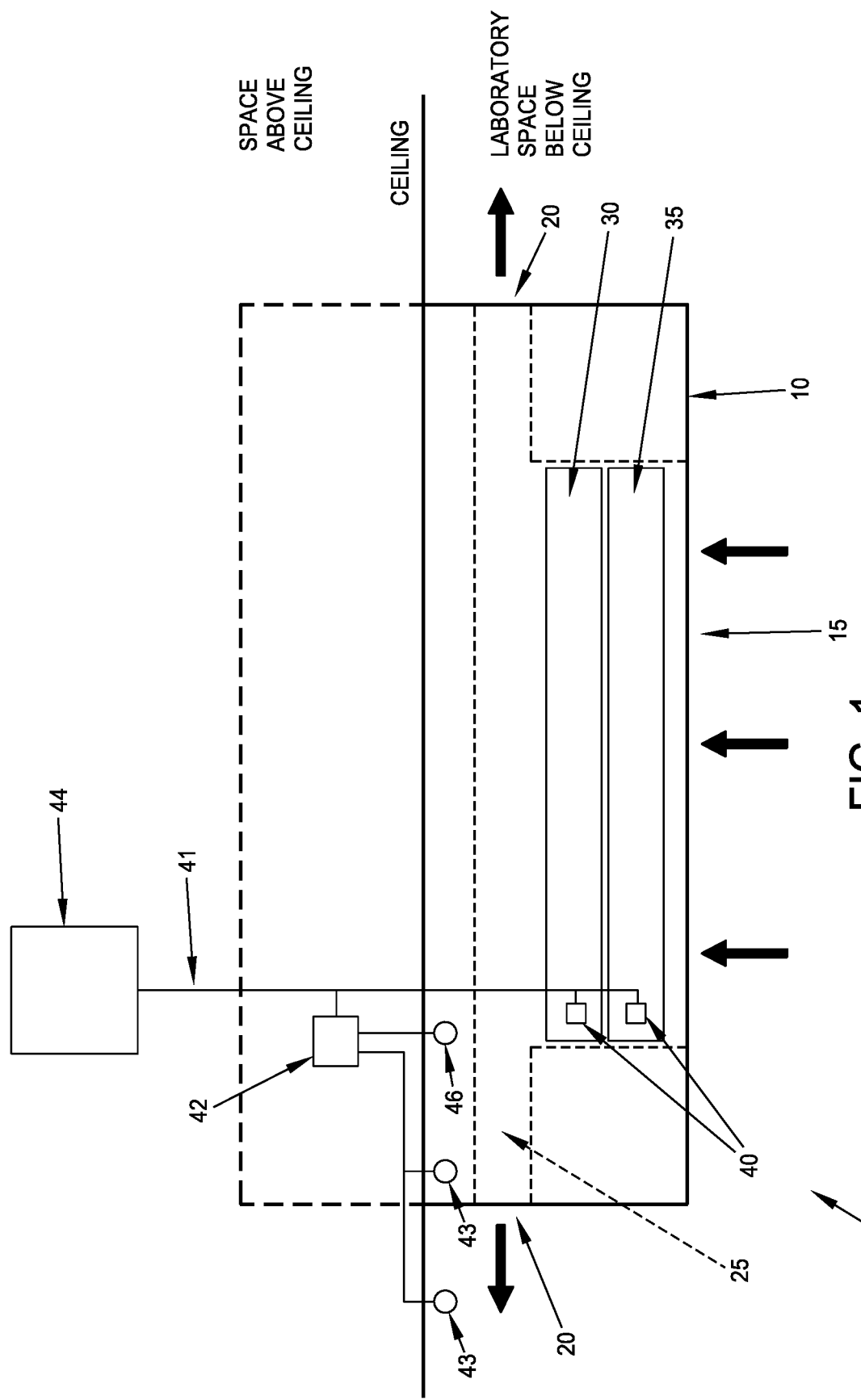
FIG. 1 is a schematic view of a novel air treatment device formed in accordance with the present invention.

In one form of the invention, and looking now at FIG. 1, there is provided a novel air treatment device 5 which comprises a housing 10 which is preferably secured to the ceiling of a laboratory space (and/or other building spaces such as hospital spaces, anatomy labs, animal care facilities, utility rooms containing heating systems and the like, garages, locker rooms, etc.). Housing 10 defines an air inlet 15, at least one air outlet 20, and a passageway 25 extending through housing 10 and connecting air inlet 15 with the at least one air outlet 20. A circulation fan 30 is disposed in passageway 25 so as to draw the air of a laboratory space (and/or other building spaces such as hospital spaces, anatomy labs, animal care facilities, utility rooms containing heating systems and the like, garages, locker rooms, etc.) into air inlet 15, move that air through passageway 25, and then return that air to the laboratory space (and/or other building spaces such as hospital spaces, anatomy labs, animal care facilities, utility rooms containing heating systems and the like, garages, locker rooms, etc.) through the at least one air outlet 20. Air inlet 15, the at least one air outlet 20, passageway 25 and circulation fan 30 are configured so as to ensure that substantially all of the air in a given space is circulated through novel air treatment device 5 on a regular and frequent basis.

In accordance with the present invention, novel air treatment device 5 includes a filter 35 which is adapted for purging noxious substances (e.g., hazardous chemicals) from air. More particularly, filter 35 is disposed in passageway 25 so that air from a laboratory space (and/or other building spaces such as hospital spaces, anatomy labs, animal care facilities, utility rooms containing heating systems and the like, garages, locker rooms, etc.), passing through passageway 25, is filtered by filter 35, whereby to remove noxious substances (e.g., hazardous chemicals) from the air of the laboratory space (and/or other building spaces). Thus, novel air treatment device 5 draws in the air of the laboratory space (and/or other building spaces), filters that air so as to purge noxious substances (e.g., hazardous chemicals) from the air, and then returns the filtered air back to the laboratory space (and/or other building spaces), with substantially no loss of air and, significantly, with substantially no change in the heat content of the air.

As a result, inasmuch as novel air treatment device 5 removes noxious substances (e.g., hazardous chemicals) from the air of the laboratory space (and/or other building spaces such as hospital spaces, anatomy labs, animal care facilities, utility rooms containing heating systems and the like, garages, locker rooms, etc.), the rate of air exchanges for that laboratory space (and/or other building spaces) may be reduced from the increased rate of air exchanges (e.g., 8-12 air exchanges per hour) normally associated with that laboratory space (and/or other building spaces) to the "normal" rate of air exchanges (e.g., 2-4 air exchanges per hour) for a standard room in the building. In this way, the air exchange rate for a laboratory space (and/or other building spaces) which would traditionally require a higher rate of air exchanges (e.g., 8-12 air exchanges per hour) may be reduced to that of a room requiring a standard rate of air exchanges (e.g., 2-4 air exchanges per hour), whereby to significantly reduce the energy losses associated with the air exchanges.

In essence, novel air treatment device 5 effectively transforms the "air exchange load" of a "higher air exchange rate space" (e.g., one requiring 8-12 air exchanges per hour) into the "air exchange load" of a "lower air exchange rate space" (e.g., one requiring 2-4 air exchanges per hour), whereby to significantly reduce the energy losses associated with the air exchange process, while still ensuring the comfort and/or safety of the occupants.

Significantly, in addition to providing a reduction in the energy losses associated with the air exchange process, novel air treatment device 5 also provides higher quality air for the occupants of the laboratory space (and/or other building spaces such as hospital spaces, anatomy labs, animal care facilities, utility rooms containing heating systems and the like, garages, locker rooms, etc.). This is because novel air treatment device 5 actively purges noxious substances (e.g., hazardous chemicals) from the air of the laboratory space (and/or other building spaces), rather than simply diluting them with an increased rate of air exchange.

As discussed above, filter 35 is designed to purge noxious substances (e.g., hazardous chemicals) from the laboratory space air. More particularly, filter 35 is configured to remove chemicals from the air of the laboratory space, wherein those chemicals may comprise non-particulates, including fumes, vapors, volatiles, etc. In one preferred form of the invention, filter 35 is configured to remove at least one of solvents, acids and bases from the air of the laboratory space. In one particularly preferred form of the invention, filter 35 is configured to remove at least two of solvents, acids and bases from the air of the laboratory space.

Figure 2:
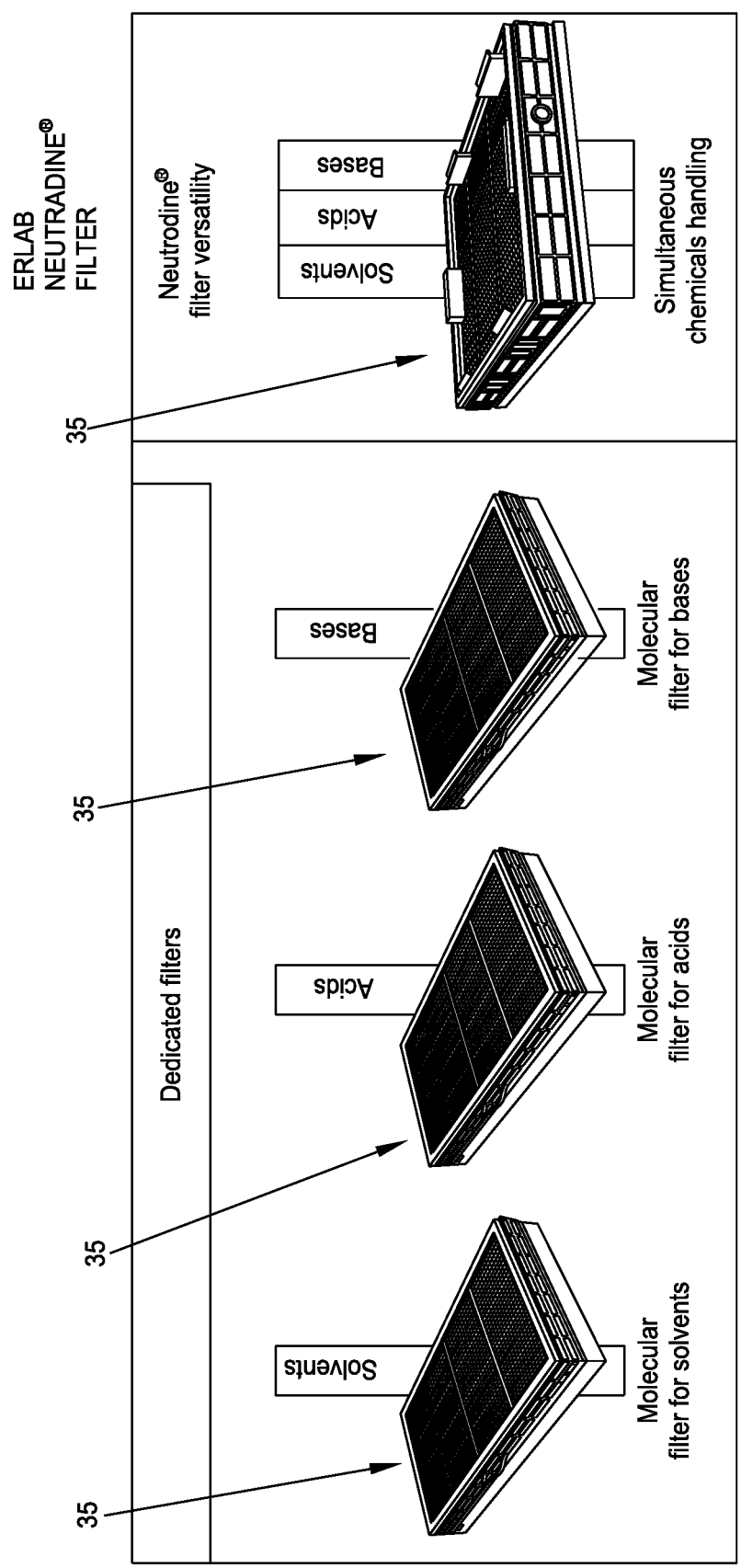
FIG. 2 is a schematic view of one preferred filter which may be used in the novel air treatment device shown in FIG. 1.

Filter 35 may be of the sort commonly utilized in ductless fumehoods. Preferably filter 35 is a Neutrodine® filter of the sort sold by Erlab of Rowley, Mass., USA (see FIG. 2), which is a cassette-based, multi-stage filter capable of simultaneously handling a multitude of different chemical families, e.g., solvents, acids and bases. If filter 35 is not a cassette-based, multi-stage filter, it may comprise several independent filters arranged in series so as to ensure effective purging of noxious substances (e.g., hazardous chemicals).

It will be appreciated that one or more novel air treatment devices 5 may be used for each laboratory space (and/or other building spaces such as hospital spaces, anatomy labs, animal care facilities, utility rooms containing heating systems and the like, garages, locker rooms, etc.), depending upon the size of the laboratory space (and/or other building spaces) and the capacity of novel air treatment device 5. Thus, for example, in a typical chemistry laboratory of 1000 square feet, five novel air treatment devices 5 may be provided to service the laboratory space.

In one preferred form of the invention, novel air treatment device 5 includes one or more sensors 40 (FIG. 1) for monitoring proper function of the operational elements of the novel air treatment device (e.g., circulation fan 30 and filter 35, etc.), and these sensors 40 are preferably connected (e.g., by wire or wireless communication 41) to a monitoring system 42 for activating an alarm 43 (e.g., an audible alarm and/or a visual, light-based alarm) in the event that proper function of the operational elements (e.g., circulation fan 30 and filter 35, etc.) is interrupted.

Alternatively, or additionally, sensors 40 may be connected (e.g., by wire or wireless communication 41) to the master air control system 44 for the building. In the event that proper function of one or more of the operational elements (e.g., circulation fan 30, filter 35, etc.) of one or more novel air treatment device(s) 5 is interrupted, master air control system 44 for the building can automatically increase the rate of air exchanges for the affected laboratory space (and/or other building spaces such as hospital spaces, anatomy labs, animal care facilities, utility rooms containing heating systems and the like, garages, locker rooms, etc.), e.g., from the "normal" rate of air exchanges (e.g., 2-4 air exchanges per hour) to the higher rate of air exchanges (e.g., 8-12 air changes per hour), whereby to ensure the comfort and/or safety of the occupants of that laboratory space (and/or other building spaces).

In one preferred form of the invention, novel air treatment device 5 is mounted to the ceiling of the laboratory space (and/or other building spaces such as hospital spaces, anatomy labs, animal care facilities, utility rooms containing heating systems and the like, garages, locker rooms, etc.), so that the novel air treatment device does not interfere with normal space function and has ready access to the air in the laboratory space (and/or other building spaces). Note that where the laboratory space (and/or other building spaces) has a "drop-down" ceiling, a portion of novel air treatment device 5 may protrude up into the region above the "drop-down" ceiling.

Alternatively, novel air treatment device 5 may be configured to be mounted to a wall of the laboratory space (and/or other building spaces), or to both the ceiling and a wall of the laboratory space (and/or other building spaces).

Also, novel air treatment device 5 can be free-standing, e.g., housing 10 may be mounted to a base which sits on the floor of the laboratory space (and/or other building spaces).

Significantly, the present invention provides a new approach for monitoring the air quality in a building, and particularly for monitoring the air quality in building spaces where noxious substances (e.g., hazardous chemicals) may be present, and for advising personnel in the event of possible issues with the air quality in those spaces. To this end, novel air treatment device 5 preferably further comprises a sensor 46 for monitoring the air quality of the ambient air in the laboratory space (and/or other building spaces). Sensor 46 is preferably connected (e.g., by wire or wireless communication 41) to monitoring system 42 for activating alarm 43 (e.g., an audible alarm and/or a visual light-based alarm) in the event that the air quality of the ambient air in the laboratory space (and/or other building spaces) should deteriorate below a predetermined air quality level.

Figure 3:
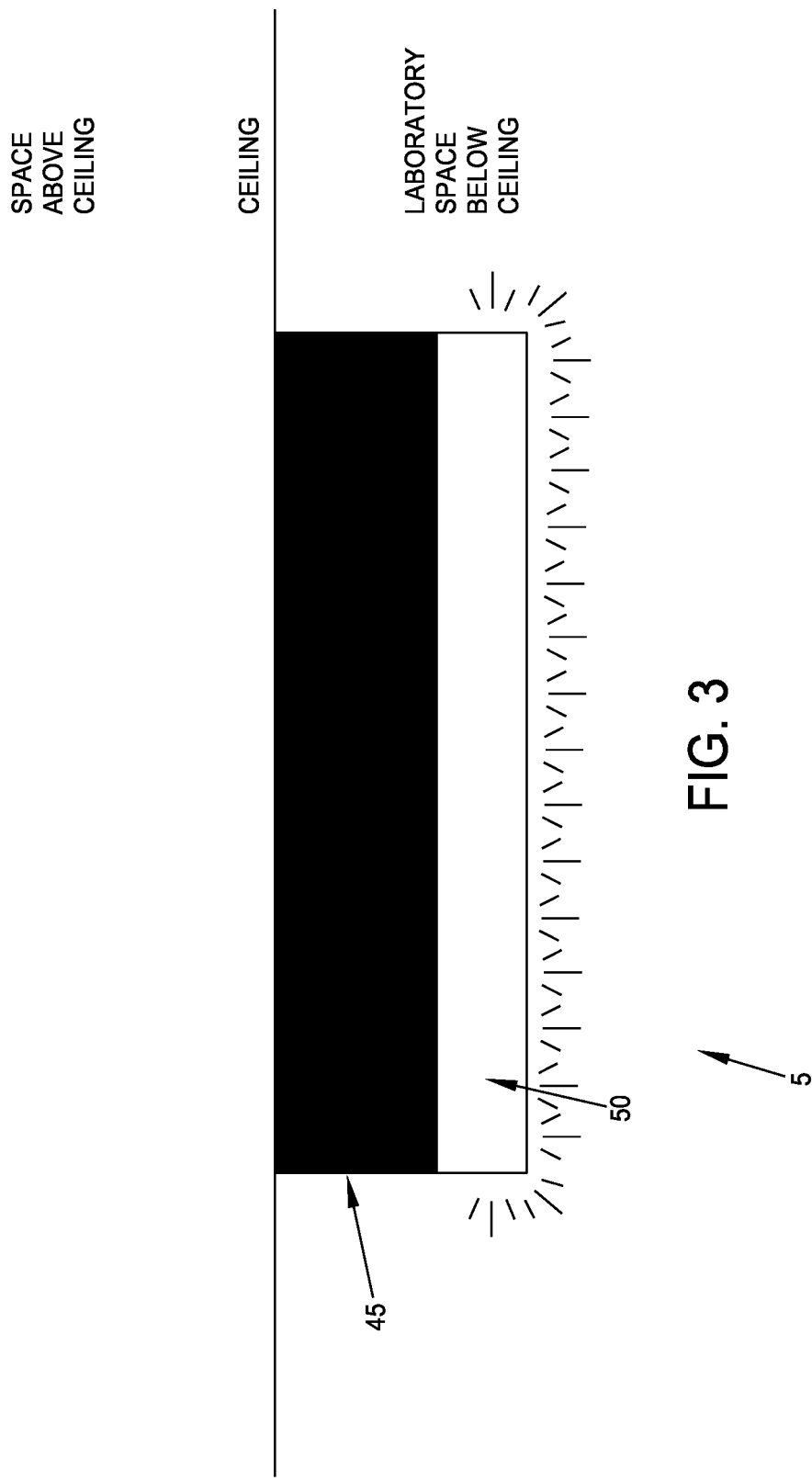
FIG. 3 is a schematic view of another novel air treatment device formed in accordance with the present invention.

If desired, in order to give novel air treatment device 5 a "weightless" appearance on the ceiling of the laboratory space (and/or other building spaces), and looking now at FIG. 3, novel air treatment device 5 may have a dark base 45 at the portions where it attaches to the ceiling of the laboratory space (and/or other building spaces), and a band of light 50 set about the perimeter portion of novel air treatment device 5 which projects into the laboratory space (and/or other building spaces). This band of light 50 may be purely decorative, e.g., it may be a light blue light to create a desired ambience for the laboratory space (and/or other building spaces); or the band of light 50 may be functional, e.g., it may be a "white" light to provide illumination for the laboratory space (and/or other building spaces).

Figure 4:
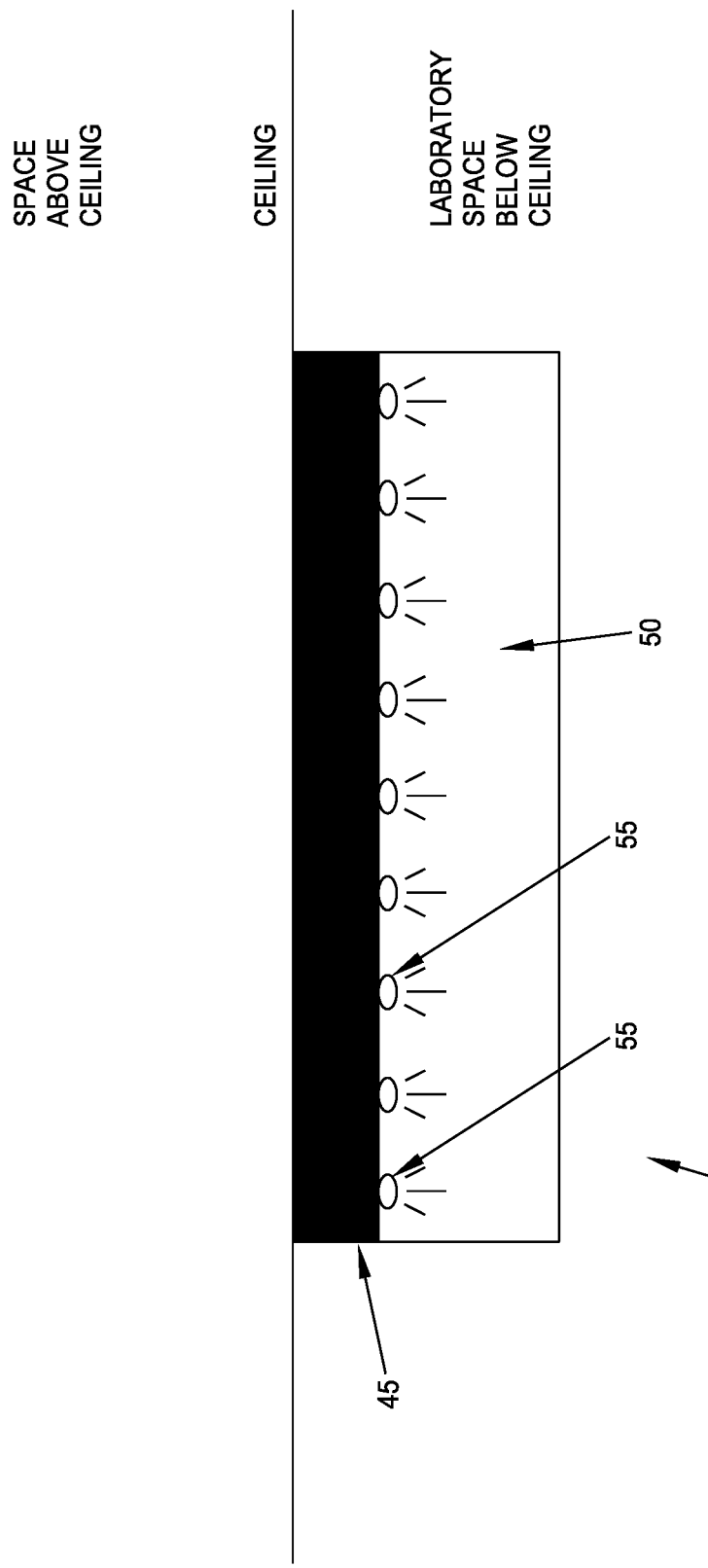
FIG. 4 is a schematic view of still another novel air treatment device formed in accordance with the present invention.
Figure 5:
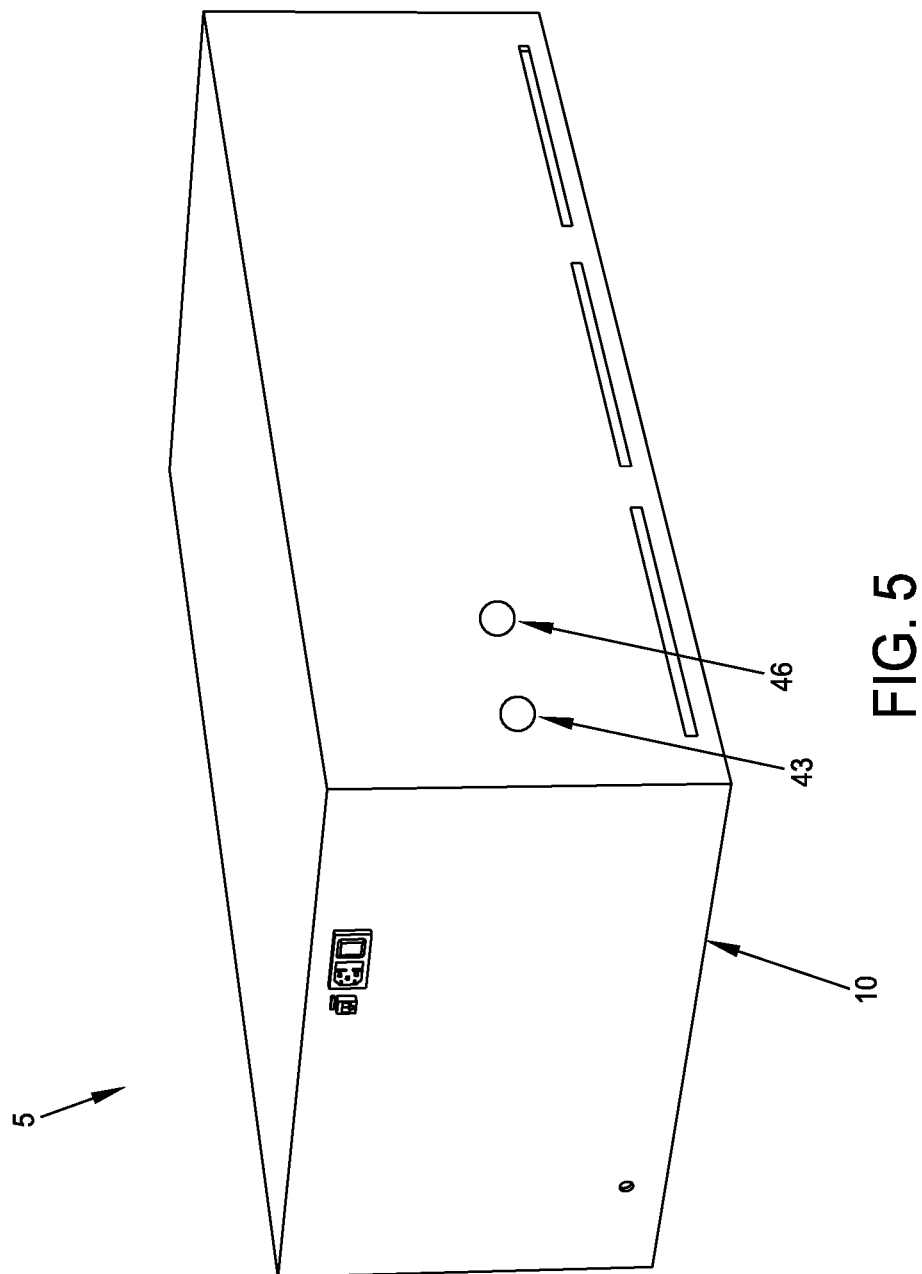
FIGS. 5-8 are schematic views of yet another novel air treatment device formed in accordance with the present invention.
Figure 6:
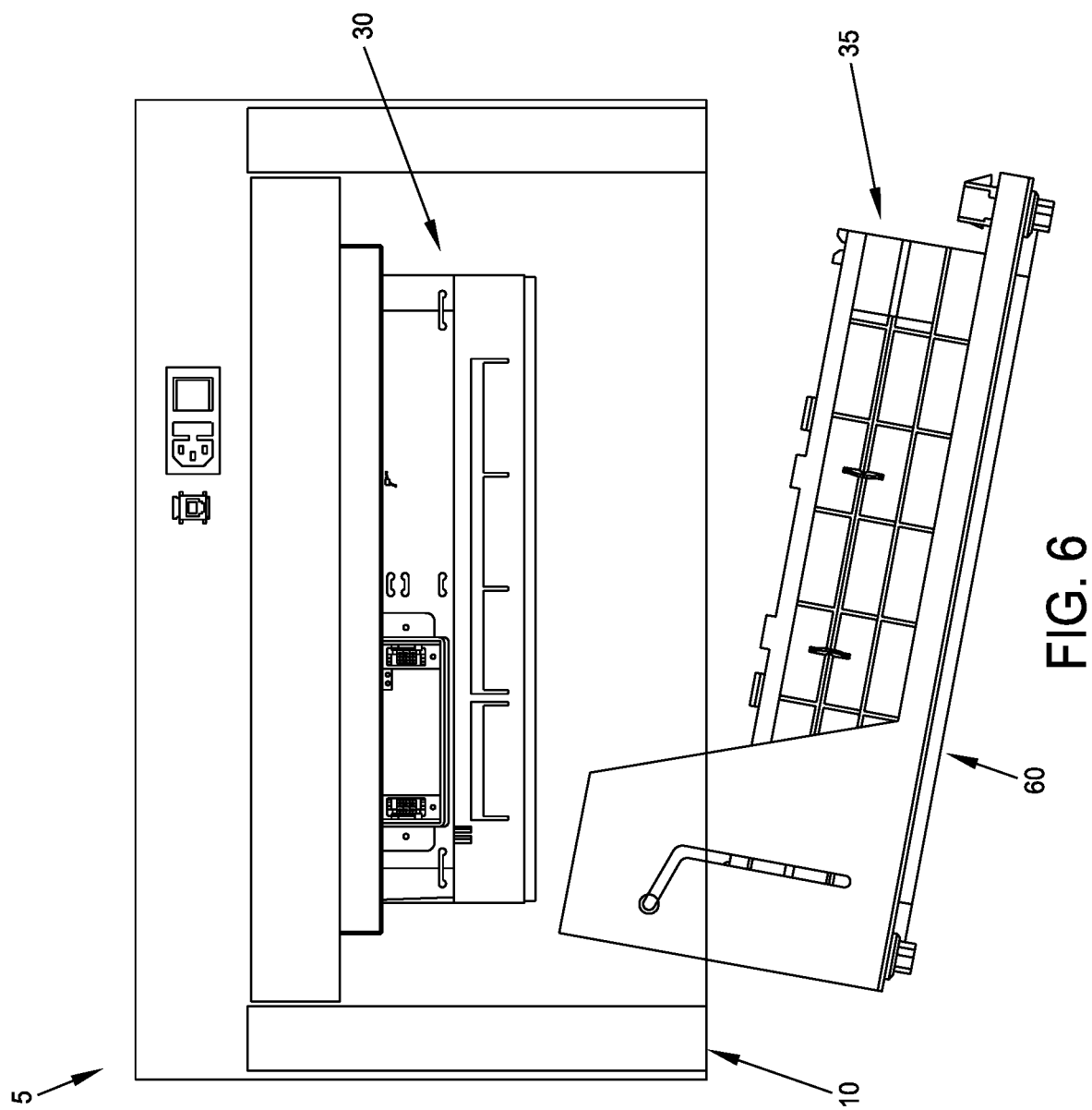
Figure 7:
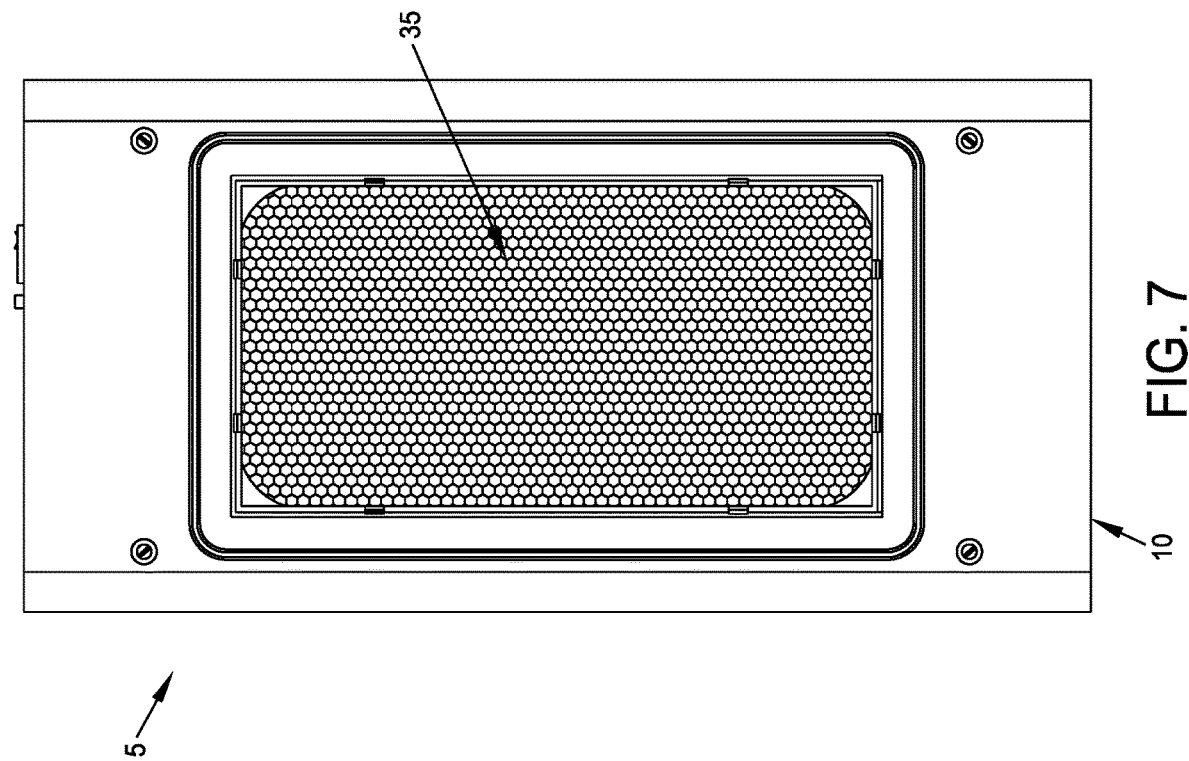
Figure 8:
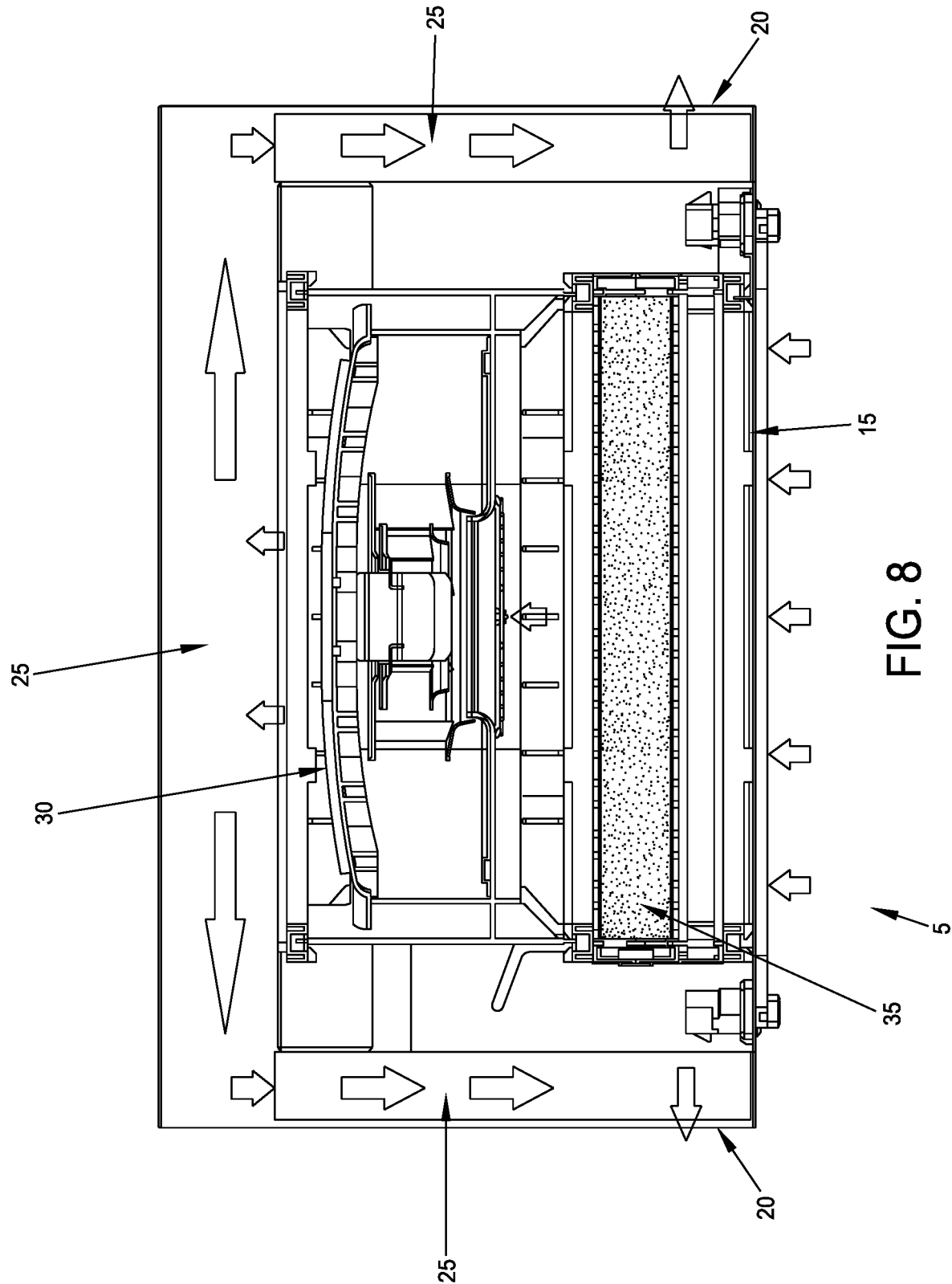
Figure 9:
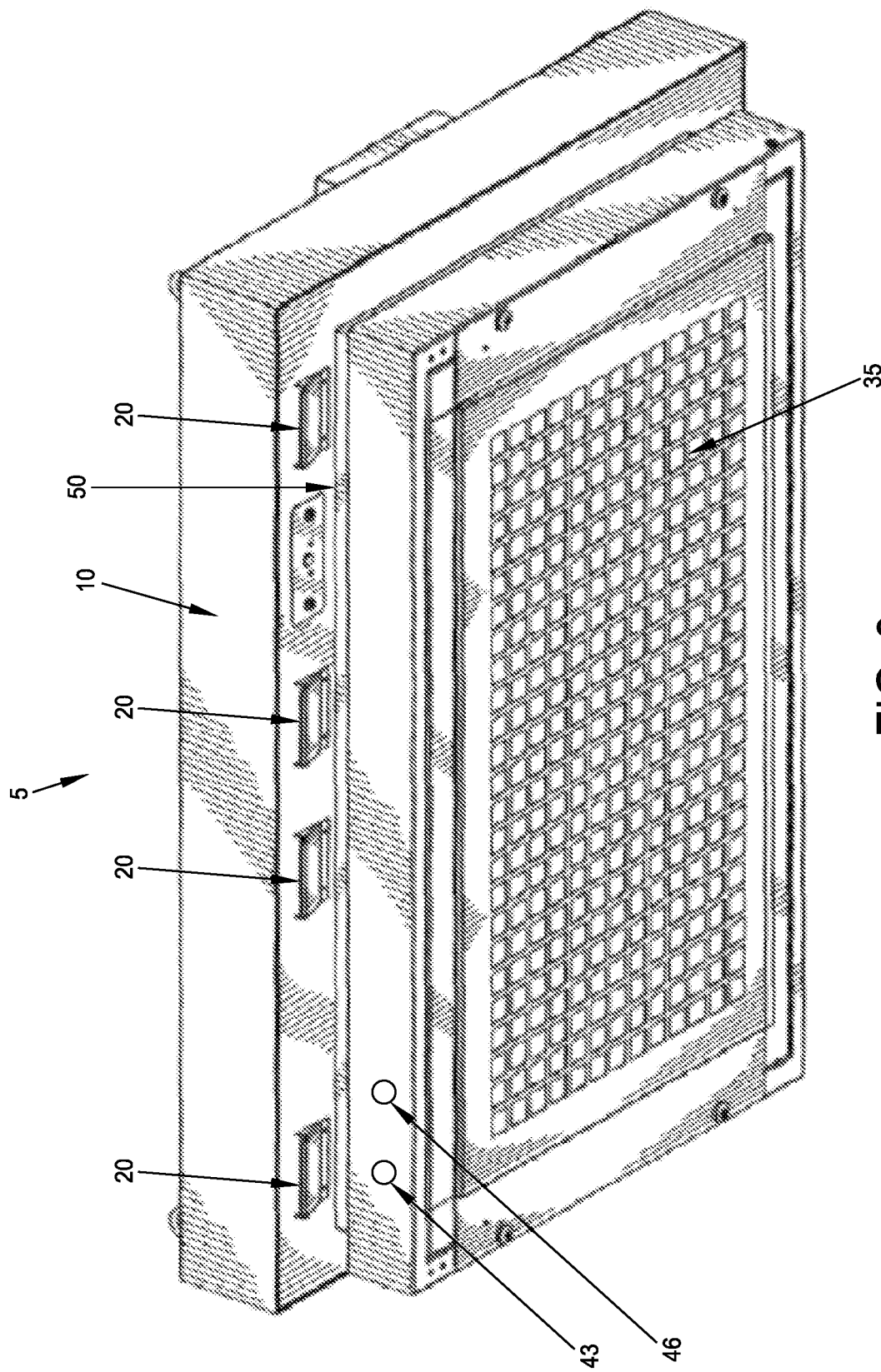
FIGS. 9-17 are schematic views of another novel air treatment device formed in accordance with the present invention.
Figure 10:
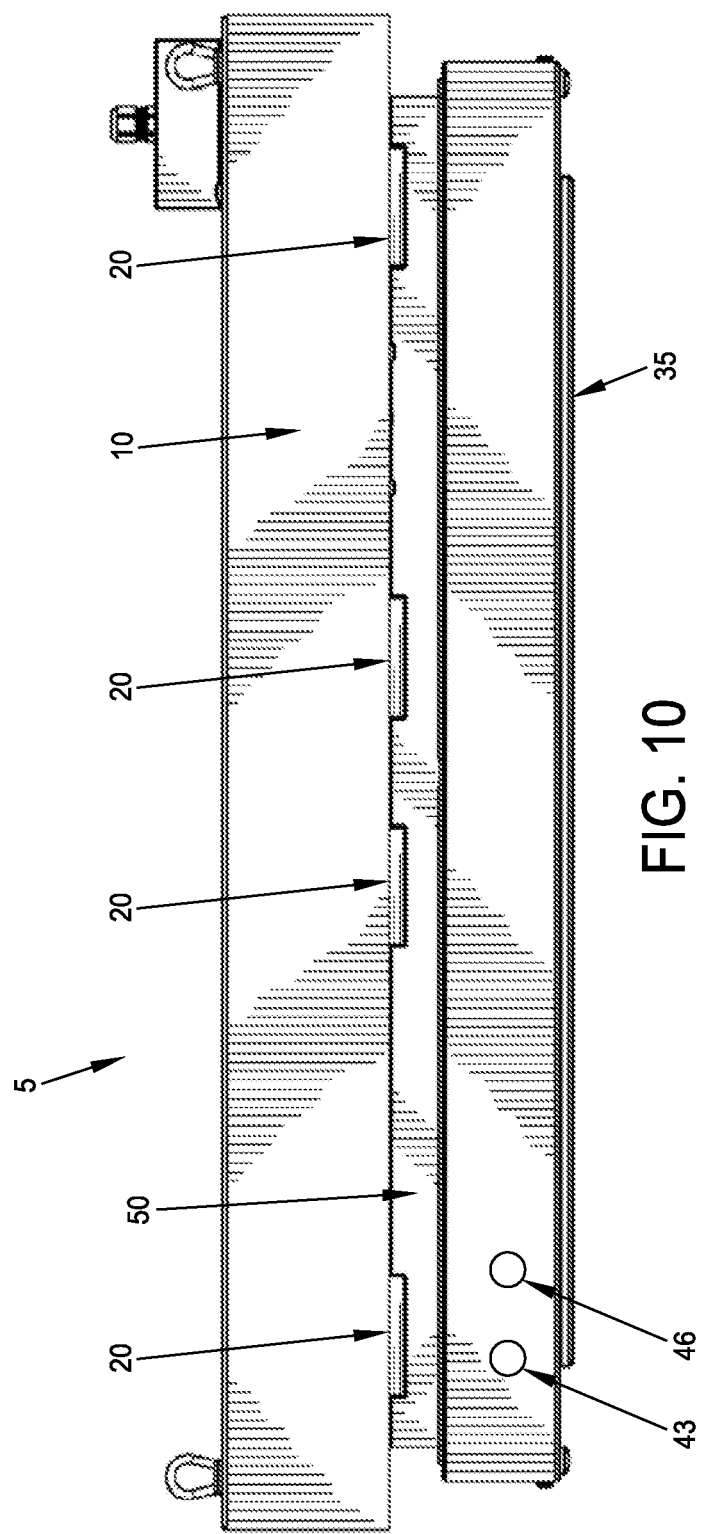
Figure 11:
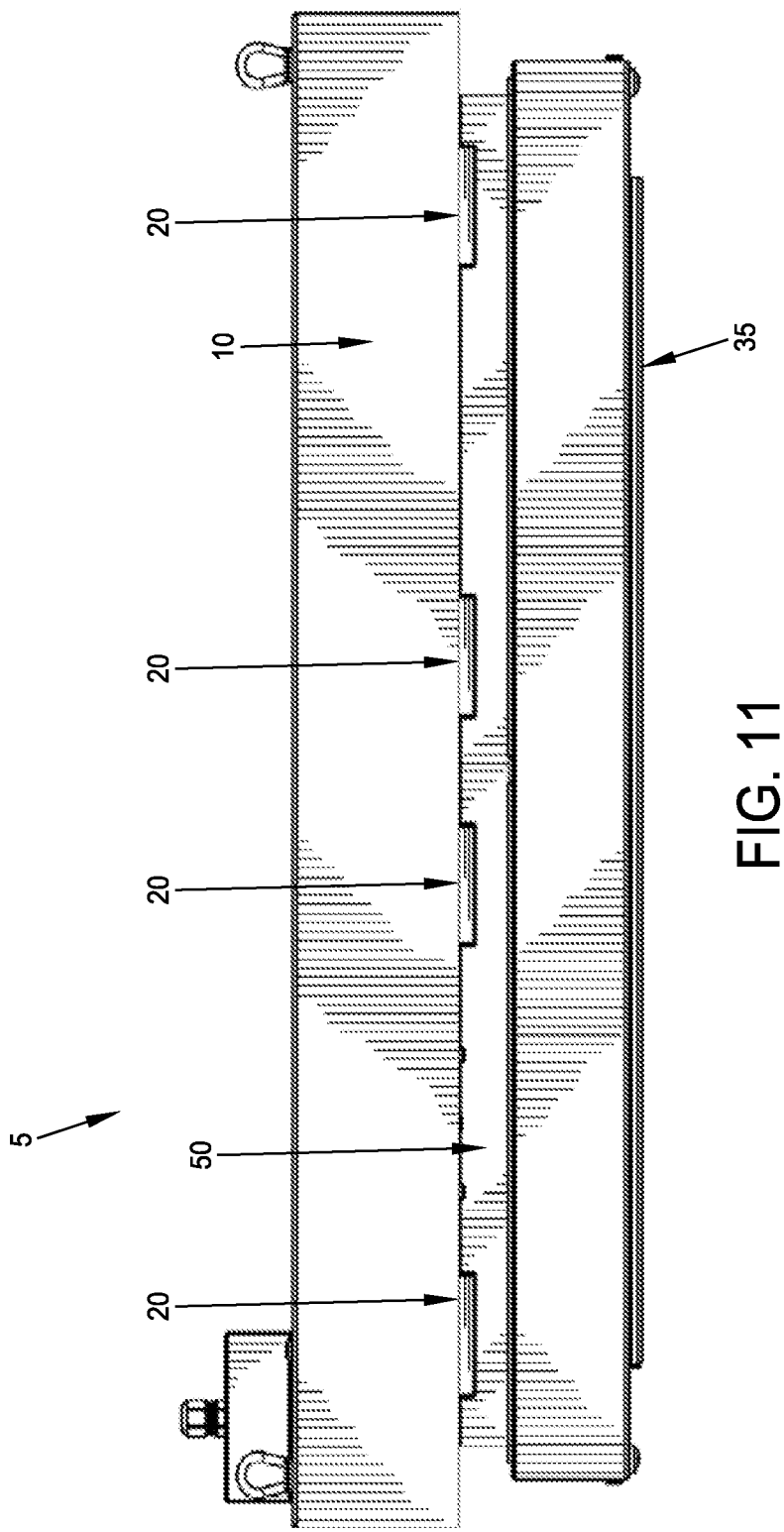
Figure 12:
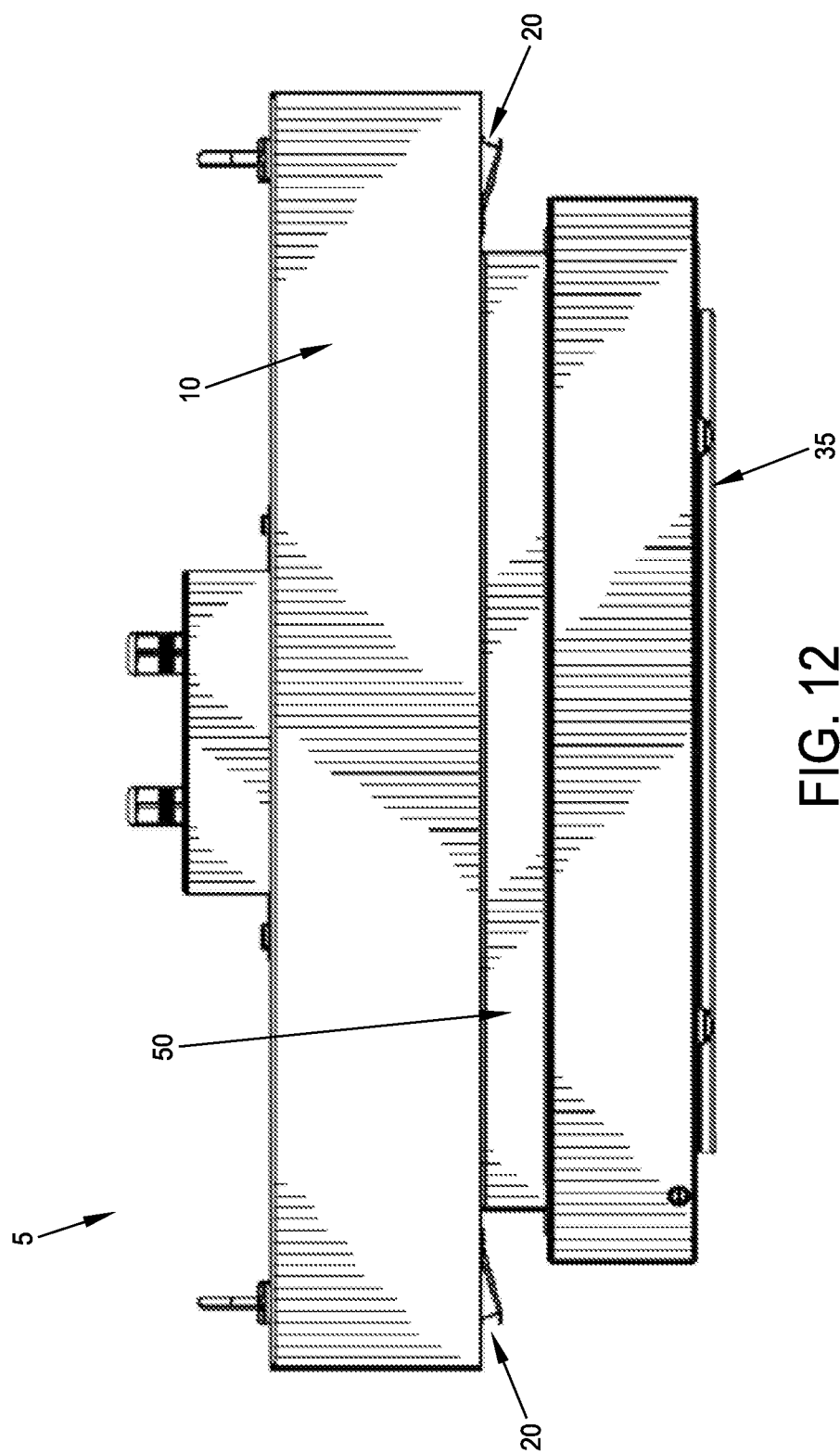
Figure 13:
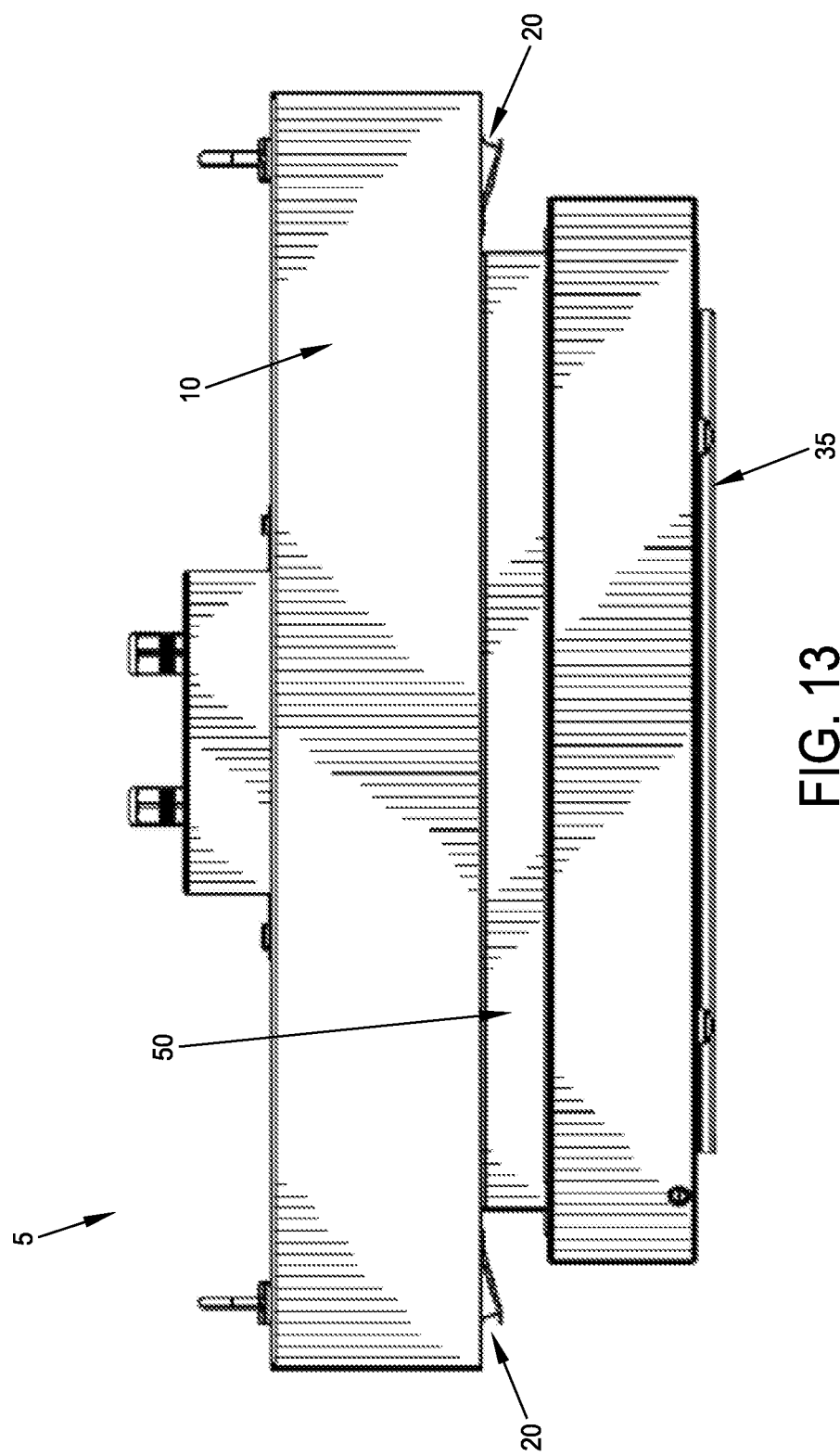
Figure 14:
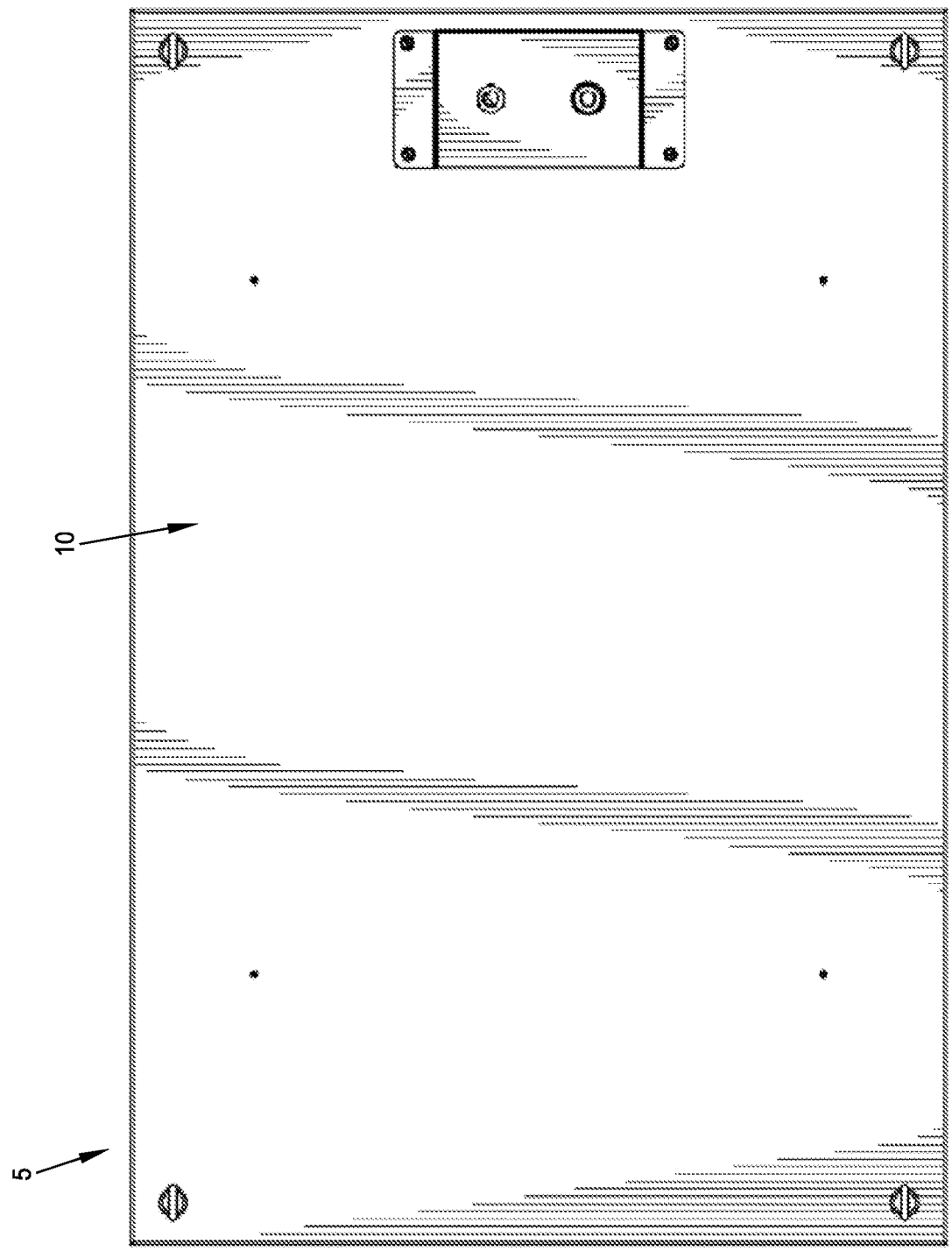
Figure 15:
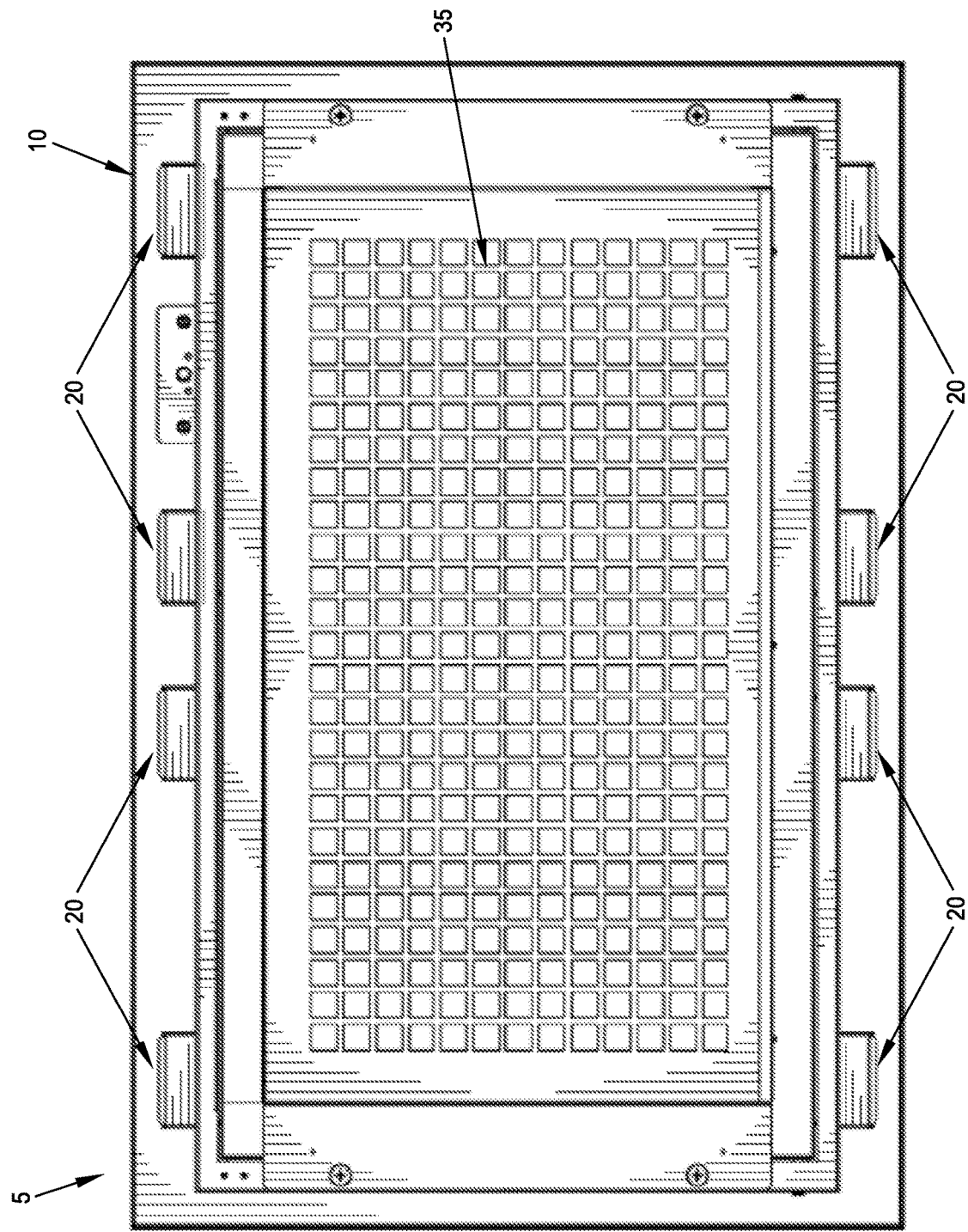
Figure 16:
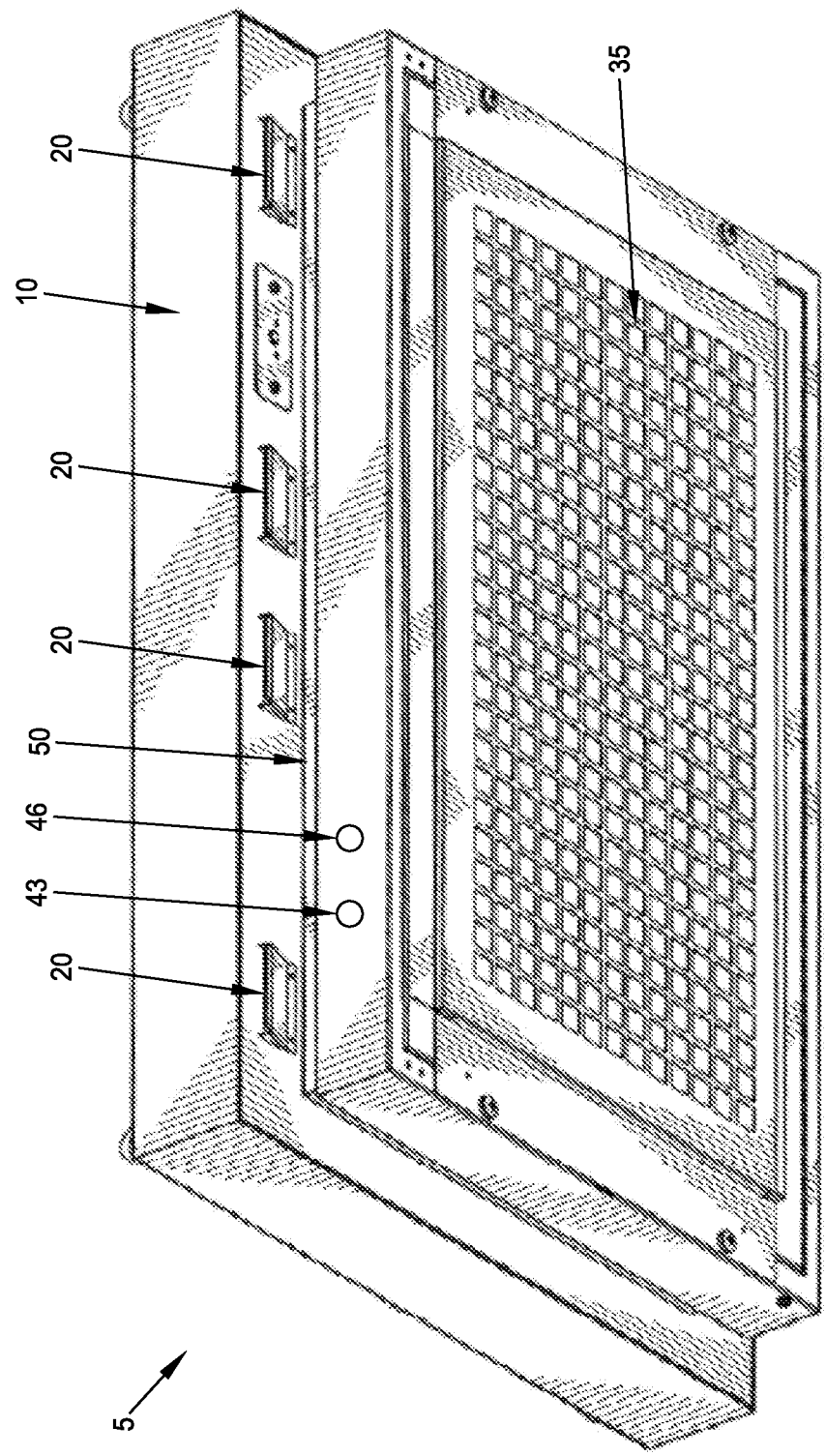
Figure 17:
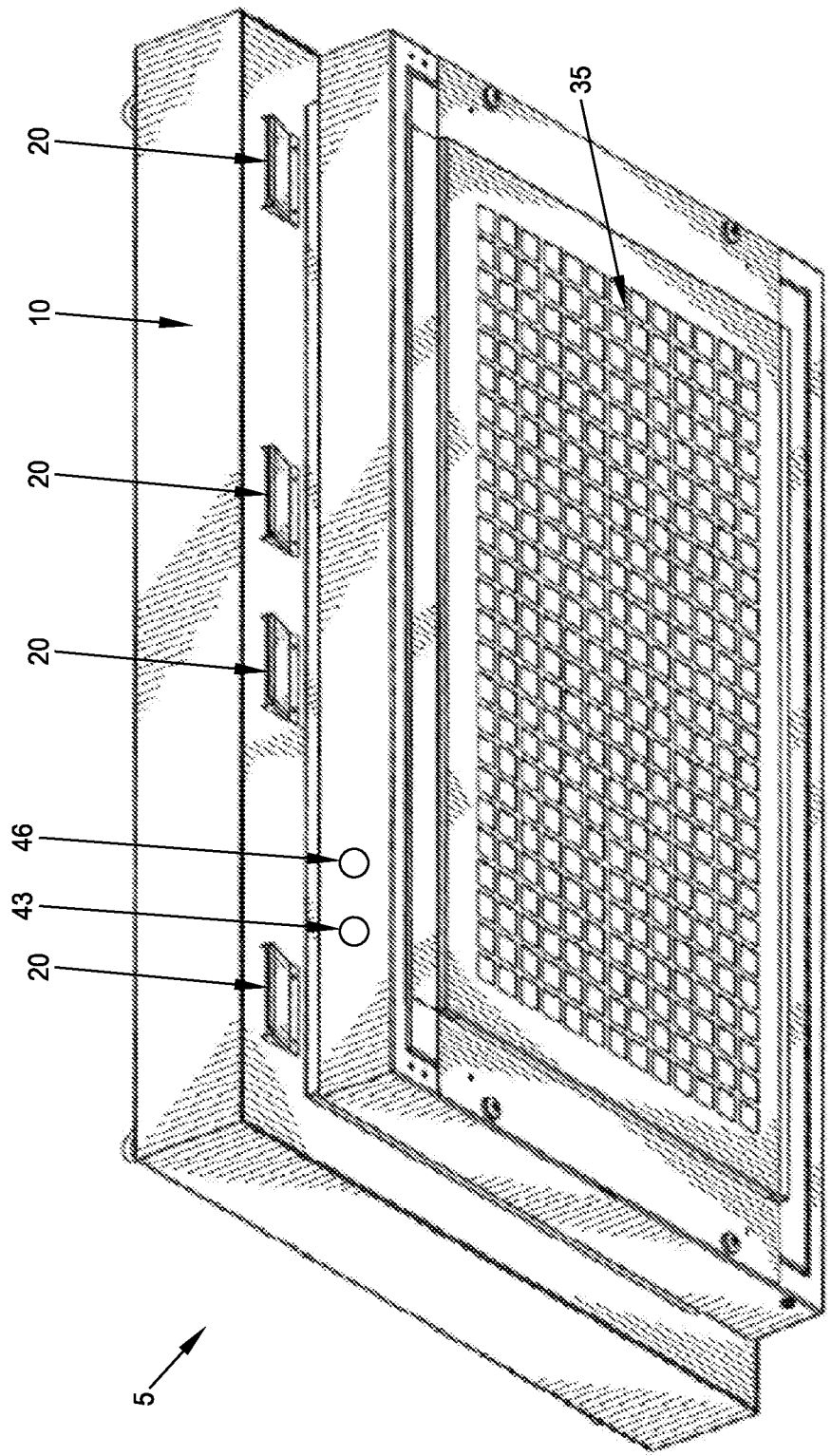

Furthermore, this band of light 50 may comprise a continuous band of light such as is shown in FIG. 3, or it may comprise an interrupted band of light created by a plurality of point sources 55 (e.g., LED lights) such as is shown in FIG. 4.

In addition, if desired, band of light 50 may be informational, e.g., band of light 50 may have one color (e.g., blue) if novel air treatment device 5 is functioning properly and/or if the air quality of the ambient air in the laboratory space (and/or other building spaces) remains above a predetermined air quality level; and band of light 50 may have another color (e.g., red) if the novel air treatment device is not functioning properly and/or if the air quality of the ambient air in the laboratory space (and/or other building spaces) deteriorates below a predetermined air quality level. Thus, in this form of the invention, band of light 50 may serve the same purpose as a visual, light-based alarm 43 (and, in this form of the invention, band of light 50 may be controlled by monitoring system 42, which is connected to sensors 40 and sensors 46).

In one preferred form of the invention, novel air treatment device 5 has its sensors 40 and sensors 46 connected to monitoring system 42, and monitoring system 42 is connected to a visual alarm 43 and/or band of light 50, and monitoring system 42 is programmed to change the state of alarm 43 and/or band of light 50, in the event that (i) the operational elements (e.g., circulation fan 30, filter 35, etc.) of novel air treatment device 5 are not functioning properly, or (ii) the air quality of the ambient air in the laboratory space (and/or other building spaces) should deteriorate below a predetermined air quality level. In this way, a person located in the laboratory space (and/or other building spaces) will know, simply by observing the state of alarm 43 and/or band of light 50, if the novel air treatment device requires servicing (e.g., to change a depleted filter 35, etc.) and/or if the air quality of the ambient air in the laboratory space (and/or other building spaces) has deteriorated below a predetermined air quality level. In this respect it will also be appreciated that, by placing novel air treatment device 5 on the ceiling of the laboratory space (and/or other building spaces), and by extending band of light 50 about the entire perimeter of housing 10 (or at least substantial portions thereof), a person located substantially anywhere in the laboratory space (and/or other building spaces) will generally have a direct line of sight to band of light 50 of novel air treatment device 5, whereby to be quickly and easily informed as to the operational status of novel air treatment device 5 and the air quality of the ambient air in the laboratory space (and/or other building spaces).

Alternatively, and/or additionally, novel air treatment device 5 may be configured so that band of light 50 may be continuously on if novel air treatment device 5 is functioning properly, and blinking if the novel air treatment device is not functioning properly.

FIGS. 5-8 show another preferred construction for novel air treatment device 5. In the construction shown in FIGS. 5-8, filter 35 is received in a "drop down" tray 60 which is hingedly connected to housing 10, i.e., when filter 35 is to be replaced, "drop down" tray 60 is lowered from housing 10, a new filter 35 is loaded, and then "drop down" tray 60 is reset into housing 10.

FIGS. 9-17 show still another preferred construction for novel air treatment device 5.

Method and Apparatus for Controlling Air Treatment Device 5 Using a Handheld Unit Having Scanning, Networking, Display and Input Capability In the preceding section, there is disclosed a novel air treatment device 5 for handling air in a laboratory space, where the laboratory space would normally require an increased rate of air exchanges (e.g., 8-12 air exchanges per hour) in order to ensure the comfort and/or health of the occupants, but with the provision of novel air treatment device 5, the rate of air exchanges for the laboratory space may be reduced (e.g., to 4 air exchanges per hour), whereby to reduce the energy losses associated with the air exchange process.

As noted above, novel air treatment device 5 may be connected (e.g., by wire or wireless communication) to a monitoring system (e.g., in the laboratory building or off-site) for activating an alarm in the event that proper function of the operational elements of novel air treatment device 5 (e.g., circulation fan 30, filter 35, etc.) is interrupted.

As also noted above, novel air treatment device 5 may be connected to master air control system 44 for the laboratory building such that, in the event that proper function of the operational elements of novel air treatment device 5 (e.g., circulation fan 30, filter 35, etc.) is interrupted, master air control system 44 for the laboratory building can automatically increase the rate of air exchanges provided for that laboratory space, from the previous rate of air exchanges (e.g., 4 air exchanges per hour) to a higher rate of air exchanges (e.g., 8-12 air exchanges per hour).

Figure 18:
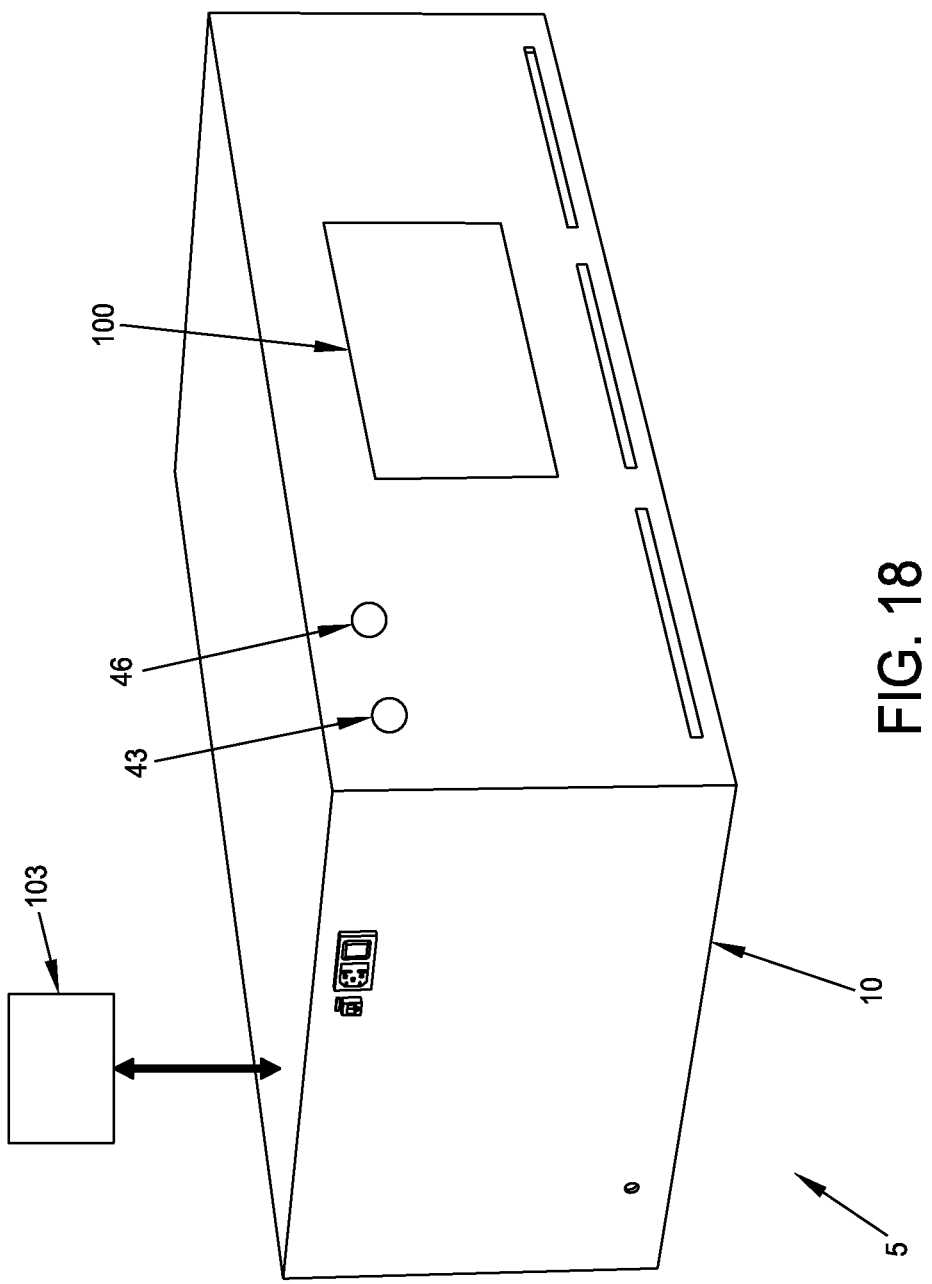
FIG. 18 is a schematic view showing another novel air treatment device formed in accordance with the present invention, wherein the novel air treatment device comprises an on-board display screen.

In one form of the present invention, and looking now at FIG. 18, novel air treatment device 5 may comprise an on-board display screen 100 for displaying information relating to novel air treatment device 5 (e.g., the on/off status of circulation fan 30, the high/medium/low operating speed of circulation fan 30, the functional/non-functional status of filter 35, the remaining useful life of filter 35, etc.). On-board display screen 100 may be a "passive" display screen or, if desired, on-board display screen 100 may be a touchscreen display such that operational commands can be provided to novel air treatment device 5 via on-board display screen 100.

If desired, where novel air treatment device 5 is connected (by wire or wireless communication) to a central control system 103 (e.g., in the laboratory building or off-site), central control system 103 may be used to monitor the status of novel air treatment device 5 and/or to provide operational commands to novel air treatment device 5. By way of example but not limitation, novel air treatment device 5 may be connected (by wire or wireless communication) to a central control system 103 located within the laboratory building. By way of further example but not limitation, novel air treatment device 5 may be connected (by wire or wireless communication) to a central control system 103 located off-site, e.g., novel air treatment device 5 may be connected via the Internet to a central control system 103 located thousands of miles away from novel air treatment device 5. In still another form of the present invention, central control system 103 may be incorporated directly into novel air treatment device 5. In this respect it will be appreciated that having the central control system within novel air treatment device 5 offers the advantage of having a complete standalone and autonomous working device which acts as its own web server platform embedded right into the working device's own central processing unit which allows, once the QR code is scanned (see below), a handheld device to take full control of that working device which, in the end, may or may not have to rely solely on central servers located either inside or outside the building.

In connection with the foregoing, it should be appreciated that a plurality of novel air treatment devices 5 (located at one or more locations) may be connected to a single central control system 103 or to multiple central control systems 103.

As noted above, the provision of an on-board display screen 100 generally increases the cost of novel air treatment device 5.

To address this, the present invention provides a new approach for controlling novel air treatment device 5 without requiring that novel air treatment device 5 have an on-board display screen. This is achieved by the provision and use of a novel system which enables the novel air treatment device 5 to be controlled using a handheld unit having scanning, networking, display and input capability.

In one preferred form of the present invention, novel air treatment device 5 is connected to a central control system 103 (e.g., a central server) via the Internet, and novel air treatment device 5 is provided with a device-specific QR code. In this form of the invention, novel air treatment device 5 may omit an on-board display screen 100, and the novel air treatment device 5 may be controlled using a handheld unit having scanning, networking, display and input capability.

Figure 19:
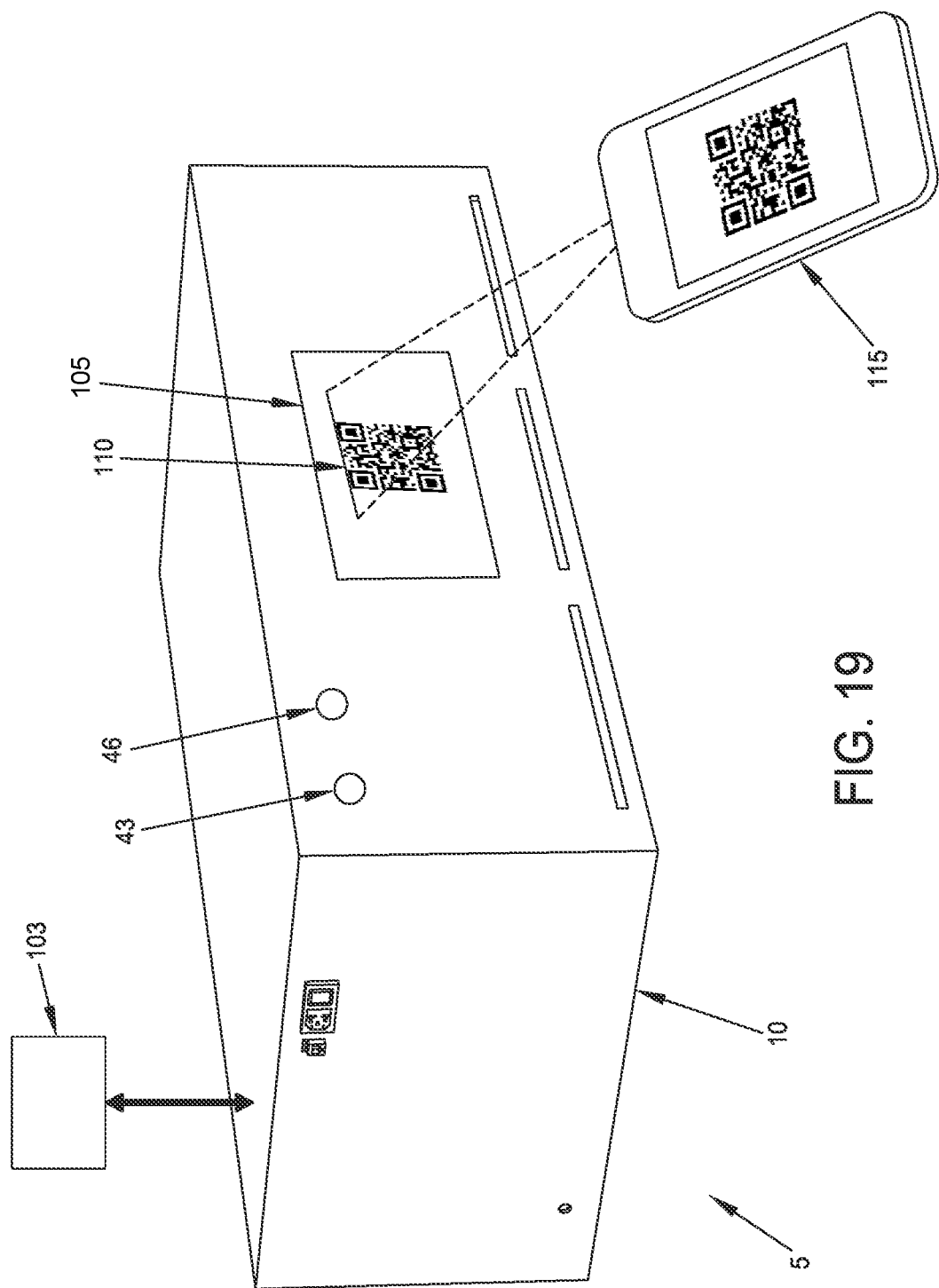
FIG. 19 is a schematic view showing another novel air treatment device formed in accordance with the present invention, wherein the novel air treatment device omits an on-board display screen and instead provides the novel air treatment device with a device-specific QR code.

More particularly, in this form of the invention, and looking now at FIG. 19, novel air treatment device 5 is connected (e.g., by wire or wireless communication) to a central control system 103 (e.g., a central server) via the Internet, and novel air treatment device 5 is provided with a label 105 carrying a device-specific QR code 110 which is capable of being machine-read (e.g., scanned) by a handheld unit 115 having scanning, networking, display and input capability (e.g., a smartphone, a tablet, a smartwatch, smart glasses, a laptop, etc.). In this form of the invention, novel air treatment device 5 reports its operational status (e.g., the on/off status of circulation fan 30, the high/medium/low operating speed of circulation fan 30, the functional/non-functional status of filter 35, the remaining useful life of filter 35, etc.) to central control system 103 (e.g., a central server) via the Internet. Central control system 103 (e.g., a central server) can then monitor novel air treatment device 5 for proper function. Central control system 103 (e.g., a central server) can also provide operational commands to novel air treatment device 5 so as to control operation of novel air treatment device 5. Furthermore, users can access central control system 103 (e.g., a central server) via a network such as the Internet in order to monitor the operational status of novel air treatment device 5 and/or to provide operational commands to novel air treatment device 5.

Significantly, a user located adjacent to novel air treatment device 5 can obtain information relating to novel air treatment device 5 (e.g., the on/off status of circulation fan 30, the high/medium/low operating speed of circulation fan 30, the functional/non-functional status of filter 35, the remaining useful life of filter 35, etc.) even though novel air treatment device 5 lacks an on-board display screen. More particularly, in order to obtain information relating to a specific novel air treatment device 5, the user can simply scan the device-specific QR code 110 associated with that specific novel air treatment device 5 using a handheld unit 115 having scanning, networking, display and input capability (e.g., a smartphone, a tablet, a smartwatch, smart glasses, a laptop, etc.). If desired, the handheld unit 115 can be configured (i.e., by appropriate software) to automatically open a web browser or other application or software for facilitating communication between handheld unit 115 and central control system 103 upon scanning of device-specific QR code 110. The device-specific QR code 110 assigned to that novel air treatment device 5 is then automatically transmitted by the handheld unit 115 to central control system 103 (e.g., the central server), which then pushes the operating information associated with the specific novel air treatment device 5 linked to that device-specific QR code (i.e., the operating information associated with that particular novel air treatment device 5) back to the handheld unit. This operating information for novel air treatment device 5 is then displayed to the user on the display screen of handheld unit 115.

In addition, and significantly, once the device-specific QR code 110 for that particular novel air treatment device 5 has been used to establish a link between the handheld unit 115 and novel air treatment device 5 via central control system 103 (e.g., the central server), the handheld unit can then be used to provide operational commands to the novel air treatment device 5 (i.e., by sending operational commands from handheld unit 115 to central control system 103, which in turn relays those operational commands to the specific novel air treatment device 5).

Thus it will be seen that, in this form of the invention, by linking the handheld unit 115 to a specific novel air treatment device via the device-specific QR code for that particular novel air treatment device, the display screen of a handheld unit 115 having scanning, networking, display and input capability (e.g., a smartphone, a tablet, a smartwatch, smart glasses, a laptop, etc.) effectively becomes the display screen for that novel air treatment device 5. This allows on-board display screen 100 to be omitted from novel air treatment device 5, which can result in substantial cost savings for the manufacturer.

Example of Novel Air Treatment Device 5 Incorporating the Aforementioned QR Code Communication Procedure To start the process of assigning a device-specific QR code 110 to a specific novel air treatment device 5 and linking that specific novel air treatment device 5 to a central control system 103, novel air treatment device 5 is first connected to a network (e.g., the Internet). This requires that a network address (i.e., IP address) be assigned to that novel air treatment device 5, and a device-specific QR code 110 be generated which identifies that specific novel air treatment device 5 and its IP address. To this end, each novel air treatment device 5 is tagged with an initial QR code at the time of manufacture or shipping. At the time of installation, the user scans this initial QR code with a handheld unit 115 having scanning, networking, display and input capability (e.g., a smart phone, a tablet, a smartwatch, smart glasses, a laptop, etc.). Using the scanned initial QR code, the networking interface (e.g., the web browser) of the handheld unit 115 can be used to display an Internet page (i.e., a web page) to the user, where all of the configuration information for novel air treatment device 5 is explained. Among other things, this Internet page explains how to edit and print a device-specific QR code 110 that corresponds to the IP address assigned to that particular novel air treatment device 5. Then, knowing the assigned IP address of the particular novel air treatment device 5, the web page provides a tool to print a device-specific QR code that points to that device's assigned IP address. This device-specific QR code is then mounted to a surface of novel air treatment device 5 (or in the vicinity of novel air treatment device 5). Thereafter, when the device-specific QR code is scanned by a handheld unit 115 having scanning, networking, display and input capability (e.g., a smart phone, tablet, etc.), the networking interface (e.g., the web browser) of the handheld unit 115 is automatically directed to central control system 103 (e.g., the central server), which then displays information about that novel air treatment device 5 on handheld unit 115, and allows control of the different operating parameters of novel air treatment device 5 (e.g., fan speed, sensor settings, etc) via the handheld unit 115.

By way of example but not limitation, the following is one specific example of the set-up and operation of the QR code communication procedure for novel air treatment device 5.

1. Assign the Device-Specific IP Address to the Novel Air Treatment Device 5.

Figure 20:
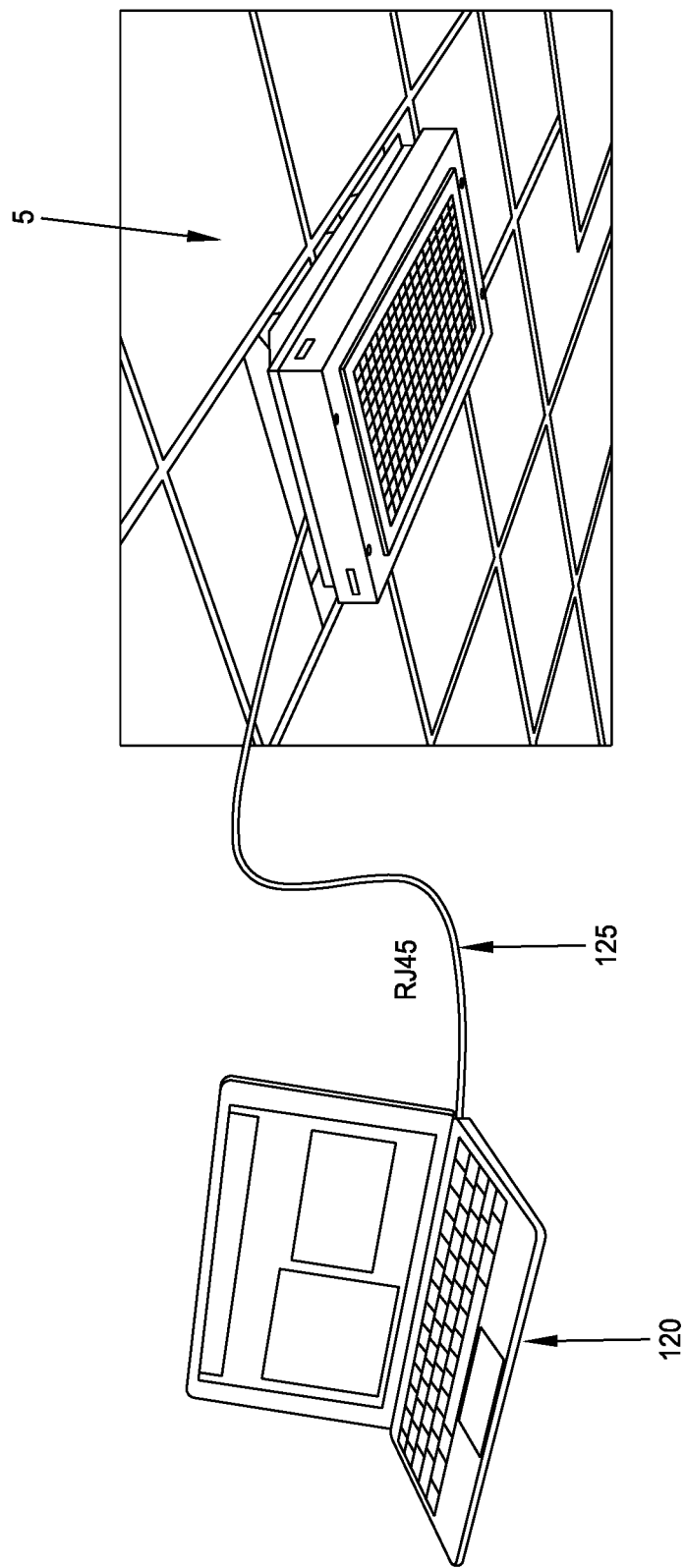
FIGS. 20 and 21 are schematic views showing the device-specific QR code being generated for a novel air treatment device.

Connect a computer 120 (FIG. 20) directly to a novel air treatment device 5, e.g., with a RJ45 cable 125. This is done by directing the computer's web browser to an appropriate IP address (e.g., 192.168.0.100) so as to access the internal settings of novel air treatment device 5.

Then, in the device "Settings" menu, enter the IP address which is to be assigned to that specific novel air treatment device 5 by the network to which novel air treatment device 5 is connected. Press "Update" to assign the IP Address to that specific novel air treatment device 5.

Press "Reboot" to restart that specific novel air treatment device 5 with the assigned IP address configuration. Disconnect the RJ45 cable from the computer and connect the novel air treatment device 5 to the network.

2. Edit and Print the Device-Specific QR Code for that Novel Air Treatment Device 5.

Figure 21:
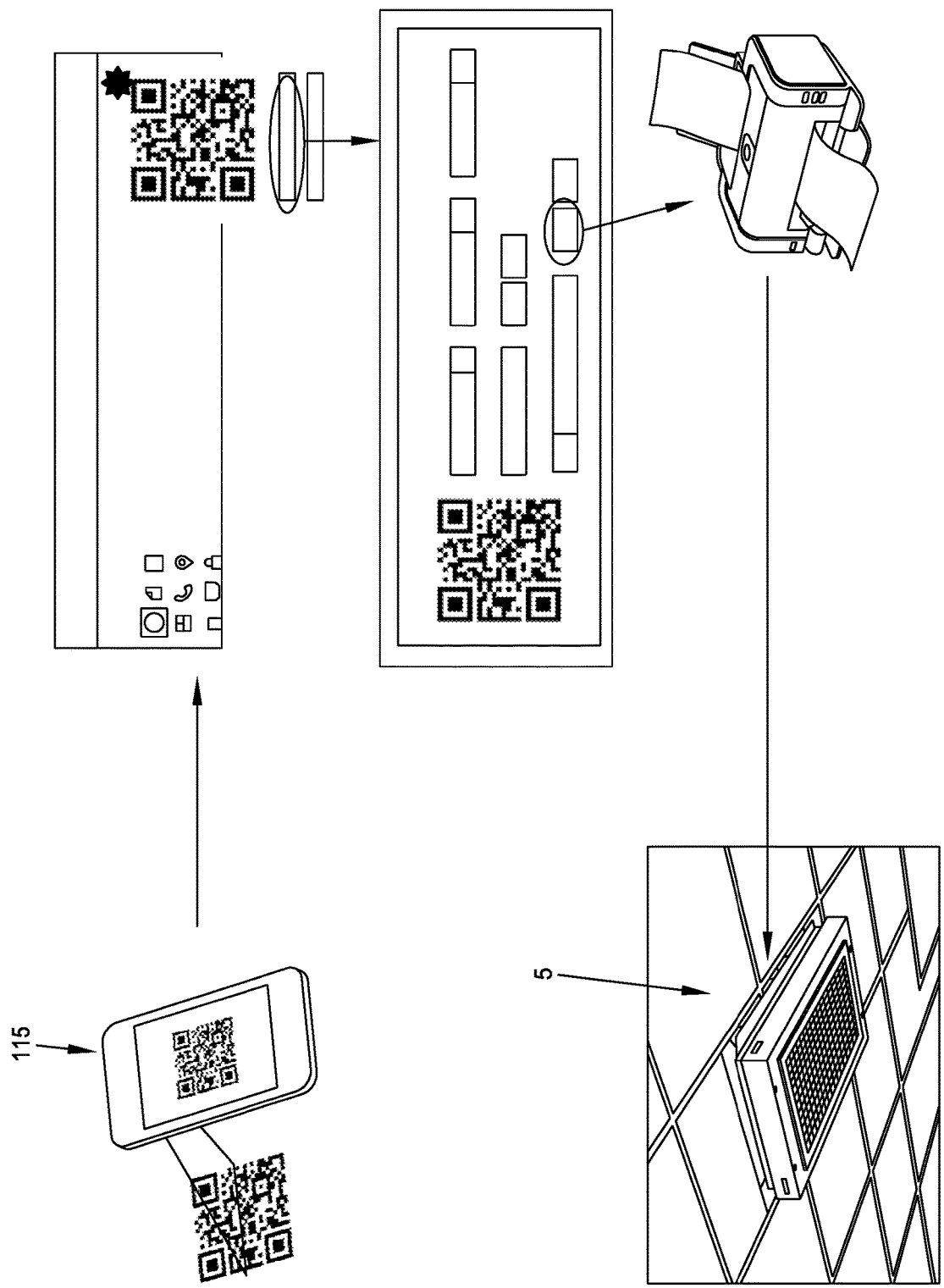

Looking now at FIG. 21, the initial QR code (placed on novel air treatment device 5 at the time of manufacture or shipping) is scanned with a handheld unit 115 having scanning, networking, display and input capability (e.g., a smartphone, a tablet, a smartwatch, smart glasses, a laptop, etc.) and handheld unit 115 connects to an appropriate QR code-generating website (e.g., http://goqr.me/#t=url).

Enter http:// and the assigned device-specific IP address of that specific novel air treatment device 5 (for example, http://192.168.0.200, which is a default address) in the "Website Address" field.

Click on the "Download" button and then click on the "PNG" button.

Print the generated QR code (e.g., qrcode.png) picture with a minimal size of 2 cm×2 cm. Mount the generated QR code 110 on novel air treatment device 5 (or close to it).

3. Communicate with and Control Novel Air Treatment Device 5.

Use a handheld unit 115 having scanning, networking, display and input capability (e.g., a smartphone, a tablet, a smartwatch, smart glasses, a laptop, etc.) to scan the device-specific QR Code 110 (FIG. 22) to automatically access the device-specific information and controls for that specific novel air treatment device 5 via central control system 103 (e.g., the central server). The handheld unit 115 having scanning, networking, display and input capability (e.g., a smartphone, a tablet, a smartwatch, smart glasses, a laptop, etc.) receives the device-specific information and controls for that specific novel air treatment device 5 from central control system 103 (e.g., the central server) and displays information about that particular novel air treatment device 5 on handheld unit 115, and allows the operation (e.g., fan speed, sensor settings, etc.) of that specific novel air treatment device 5 to be set by the user using the handheld unit 115 having scanning, networking, display and input capability (e.g., a smartphone, a tablet, a smartwatch, smart glasses, a laptop, etc.).

Using the Aforementioned QR Code Communication Procedure to Control Other Working Devices Using a Handheld Unit Having Scanning, Networking, Display and Input Capability In the preceding sections, there is disclosed a novel QR code communication procedure for allowing a handheld unit having scanning, networking, display and input capability to act in place of the on-board display screen of a novel air treatment device 5. However, it should also be appreciated that the same novel QR code communication procedure can be used to allow a handheld unit having scanning, networking, display and input capability to act in place of the on-board display screen of devices other than a novel air treatment device 5, e.g., the same novel QR code communication procedure can be used to allow a hand-held device to act in place of the on-board display screen of a fumehood, or to act in place of the on-board display screen of other air-handling equipment, or to act in place of the on-board display screen of other working devices. By way of example but not limitation, such other working devices may comprise a household device (e.g., a television, a refrigerator, a stove or microwave oven, a heating and air conditioning system, etc.), a vending machine, a ticket kiosk, a manufacturing machine, a robot, a vehicle, etc.

Thus it will be seen that the present creation allows for a simplified human-machine interface which can eliminate the need for traditional on-board display screens and/or controls by providing a fast and simple manner in which an appropriate handheld unit can provide the functionality previously provided by an on-board display screen. When a working device is coupled to a product-supporting server via the novel QR code communication procedure of the present invention, the user can then simply, and automatically, access an information-rich environment via the QR code gateway system (i.e., a QR code accessed central server), using their personal handheld unit having scanning, networking, display and input capability (e.g., their personal smartphone, tablet, smartwatch, smart glasses, laptop, etc.), whereby to obtain information about the working device and/or assume operational control of the working device.

Thus, due to the increasing network connectivity of working devices and the broad adoption of handheld units having scanning, networking, display and input capability (e.g., smartphones, tablets, smartwatches, smart glasses, laptops, etc.), users already have on their person the potential to communicate (via their personal handheld unit) with and control working devices which would normally be provided with an on-board display screen. The advantage is that the working devices can now omit the complex and expensive on-board display screen and/or controls previously required.

With the present invention, every user can use one display screen (i.e., the display screen on their personal handheld unit) to control any number of working devices, and this can be done conveniently, and only when they need it, via the aforementioned QR code communication procedure.

Thus it will be seen that, in one preferred form of the invention, the present invention uses four major technologies which, when combined, act as a system to provide for a universal means for humans to easily interface with, and take full control of, substantially any standalone equipment (i.e., working devices) without having to use built-in display screens, built-in touchscreens and/or built-in keyboards for each working device used. Using this invention can have the positive effect of lowering costs associated with machine development and production while offering users a familiar, simple and standard graphical interface which each user can feel comfortable with, and for a plurality of devices, while increasing the safety of use.

These four major technologies are:

1. A light, preferably a ring of light circling the entire working device, which will act as a simple man-machine interface, equipped on each machine, offering a universal means of visual communication, even for color-blind operators, thereby increasing safety. By way of example but not limitation, when solid, the ring of light tells an observer that the working device is working within the manufacturer's technical parameters and, when flashing (and, optionally, with a corresponding audio alarm) tells an observer that normal operating conditions have changed and therefore requires a user to take full control of that working device.

2. A device-specific QR code label, affixed on the front of the working device which is to be controlled and/or monitored, acting as a simple and universal gateway into the working device via a scanner-equipped handheld unit offering the advantage of automatically linking up to the working device's specific IP address, or other means of bi-directional communication protocol, without having to be previously informed of the working device's specific wireless communication access procedure (e.g., WIFI, RFID, Bluetooth, NFC, etc.).

3. An embedded web service technology directly integrated into the working device allowing the entire control dashboard of the working device to be virtualized in order to be linked up directly to a handheld device screen such as a smartphone, tablet, smartwatch, smart glasses, laptop, etc. Once the handheld unit has scanned the device-specific QR code label affixed to the working device, the user can now bi-directionally, and freely, monitor and/or control that working device, or any other working device equipped with this set of technologies.

4. A handheld unit equipped with an optical recognition apparatus and web browser which, once linked up to the working device's bi-directional control virtual dashboard via a web service, as described above, allows any user with any optical recognition-equipped handheld device (such as a smartphone, a tablet, a smartwatch, smart glasses, a laptop, etc.) to locally take the control of any working device anywhere via the handheld's device web browser and/or specific program and/or software application ("app", "applet", etc.), allowing a bi-directional control of the working device, thereby rendering unnecessary the provision of traditional embedded screens, touchscreens and/or keyboards on each working device to be controlled.

Thus it will be seen that, since intelligent and powerful personal handheld units is rapidly becoming the norm, the QR code communication procedure of the present invention can be used to take full advantage of these new technologies to universally allow anyone, anywhere, to locally take control of, and/or monitor, substantially any working device as the need arises.

Alternatives to QR Codes

In the foregoing disclosure, the present invention is discussed in the context of using QR codes to link a specific working device to a handheld unit (such as a smartphone, a tablet, a smartwatch, smart glasses, a laptop, etc.) via a network connection. QR codes are generally preferred since they are designed to be scanned and automatically link a web browser to a central control system (e.g., a central server). However, if desired, other machine-readable identification elements may be used instead of, or in addition to, QR codes. By way of example but not limitation, such other machine-readable identification elements may include barcodes, alphanumeric symbols, radio frequency identification (RFID) tags, near field communication (NFC) tags, etc.

Modifications

While the present invention has been described in terms of certain exemplary preferred embodiments, it will be readily understood and appreciated by those skilled in the art that it is not so limited, and that many additions, deletions and modifications may be made to the preferred embodiments discussed herein without departing from the scope of the invention.

What is claimed is:

1. A method for wirelessly controlling a working device using a handheld unit, said method comprising:
   connecting said working device to a central server by a network, wherein said working device is uniquely identified on said network by an assigned network address, and further wherein said working device and said central server are configured so that said central server can receive data concerning operation of said working device, and control operation of said working device, via said network;
   positioning a device-specific identification marker at said working device, wherein said device-specific identification marker is linked to said assigned network address of said working device;
   scanning said device-specific identification marker with said handheld unit, whereby to identify said working device and said assigned network address linked to said working device; and
   using said handheld unit to cause said central server to communicate with and control said working device at said assigned network address, whereby to allow the user to control operation of said working device via said handheld device and/or to receive data concerning said working device from said central server.

2. A method according to claim 1 wherein said working device comprises an air treatment device.

3. A method according to claim 2 wherein said air treatment device comprises a fumehood.

4. A method according to claim 1 wherein said working device is one from the group consisting of a household device, a vending machine, a ticket kiosk, a manufacturing machine, a robot, and a vehicle.

5. A method according to claim 4 wherein said household device is one from the group consisting of a television, a refrigerator, a stove or microwave oven, and a heating and air conditioning system.

6. A method according to claim 1 wherein said network comprises the Internet.

7. A method according to claim 1 wherein said network comprises a local area network.

8. A method according to claim 1 wherein said assigned network address comprises an internet protocol (IP) address.

9. A method according to claim 1 wherein said device-specific identification marker comprises a QR code.

10. A method according to claim 1 wherein said device-specific identification marker comprises a barcode.

11. A method according to claim 1 wherein said device-specific identification marker comprises an RFID tag.

12. A method according to claim 1 wherein said device-specific identification marker comprises an NFC tag.

13. A method according to claim 1 wherein said handheld unit comprises a smartphone.

14. A method according to claim 1 wherein said handheld unit comprises a tablet.

15. A method according to claim 1 wherein said handheld unit comprises a smartwatch.

16. A method according to claim 1 wherein said handheld unit comprises smart glasses.

17. A system comprising:
   a working device connected to a central server by a network, wherein said working device is uniquely identified on said network by an assigned network address, and further wherein said working device and said central server are configured so that said central server can receive data concerning operation of said working device, and control operation of said working device, via said network;

a device-specific identification marker disposed at said working device, wherein said device-specific identification marker is linked to said assigned network address of said working device; and a handheld unit having scanning, networking, display and input capability, such that said handheld unit can scan said device-specific identification marker, connect to said central server via said network, identify said working device and said assigned network address linked to said working device, and cause said central server to communicate with and control said working device at said assigned network address, whereby to allow the user to control operation of said working device via said handheld device and/or to receive data concerning said working device from said central server.

18. A system according to claim 17 wherein said working device comprises an air treatment device.

19. A system according to claim 18 wherein said air treatment device comprises a fumehood.

20. A system according to claim 17 wherein said working device is one from the group consisting of a household device, a vending machine, a ticket kiosk, a manufacturing machine, a robot, and a vehicle.

21. A system according to claim 20 wherein said household device is one from the group consisting of a television, a refrigerator, a stove or microwave oven, and a heating and air conditioning system.

22. A system according to claim 17 wherein said network comprises the Internet.

23. A system according to claim 17 wherein said device-specific identification marker comprises a QR code.

24. A system according to claim 17 wherein said handheld unit comprises one of a smartphone and a tablet.

* * * * *